(12) United States Patent
Wolz et al.

(10) Patent No.: US 11,475,016 B1
(45) Date of Patent: Oct. 18, 2022

(54) EMBROIDERY COMPOSITE ACTION CATALOG AND SYSTEMS AND METHODS OF SEARCHING THE SAME

(71) Applicant: CreateMe Technologies LLC, New York, NY (US)

(72) Inventors: Ursula C. Wolz, West Orange, NJ (US); Christopher W. Dunne, West Orange, NJ (US)

(73) Assignee: CreateMe Technologies LLC, New York, NY (US)

( * ) Notice: Subject to any disclaimer, the term of this patent is extended or adjusted under 35 U.S.C. 154(b) by 0 days.

(21) Appl. No.: 17/844,193

(22) Filed: Jun. 20, 2022

(51) Int. Cl.
*G06F 16/2457* (2019.01)
*G06F 16/248* (2019.01)
*G06N 20/00* (2019.01)
*G06F 16/28* (2019.01)
*G06K 9/62* (2022.01)

(52) U.S. Cl.
CPC ...... *G06F 16/24573* (2019.01); *G06F 16/248* (2019.01); *G06F 16/287* (2019.01); *G06F 16/288* (2019.01); *G06K 9/6256* (2013.01); *G06N 20/00* (2019.01)

(58) Field of Classification Search
CPC ..... G06T 11/60; G06T 2200/16; G06F 30/12; G06F 30/27; G06F 2113/12; G06F 16/287; G06F 16/26; G06F 16/248; G06F 16/288; G06F 16/24573; A41H 3/007; G06K 9/6256; G06N 20/00
See application file for complete search history.

(56) References Cited

U.S. PATENT DOCUMENTS

2011/0087728 A1* 4/2011 Goldman ............... G06T 11/60
709/203

\* cited by examiner

*Primary Examiner* — Hau H Hoang
(74) *Attorney, Agent, or Firm* — Patterson + Sheridan, LLP

(57) ABSTRACT

Embodiments herein describe creating a searchable catalog of composite actions for embroidery designs. The catalog can also store a design intent and the embroidery technique for each of the composite actions. The design intents and the embroidery techniques for the composite actions can be stored in a design intent hierarchy and an embroidery technique hierarchy which can then be compared to text in a search query to identify matches. These matches can then be used to identify composite actions that match the search query.

20 Claims, 25 Drawing Sheets

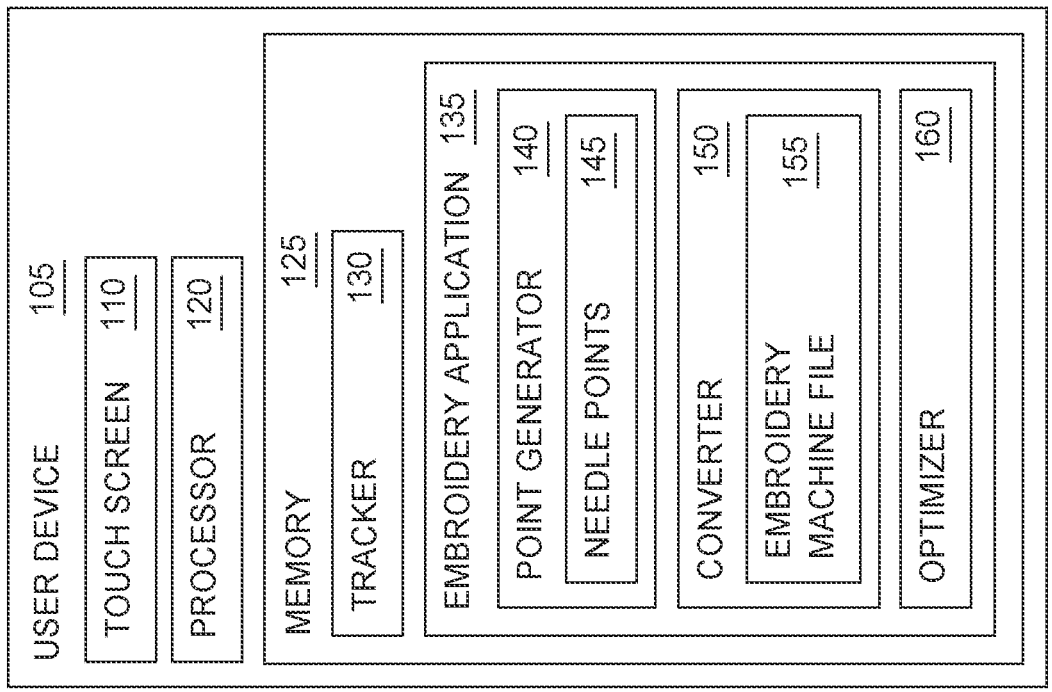
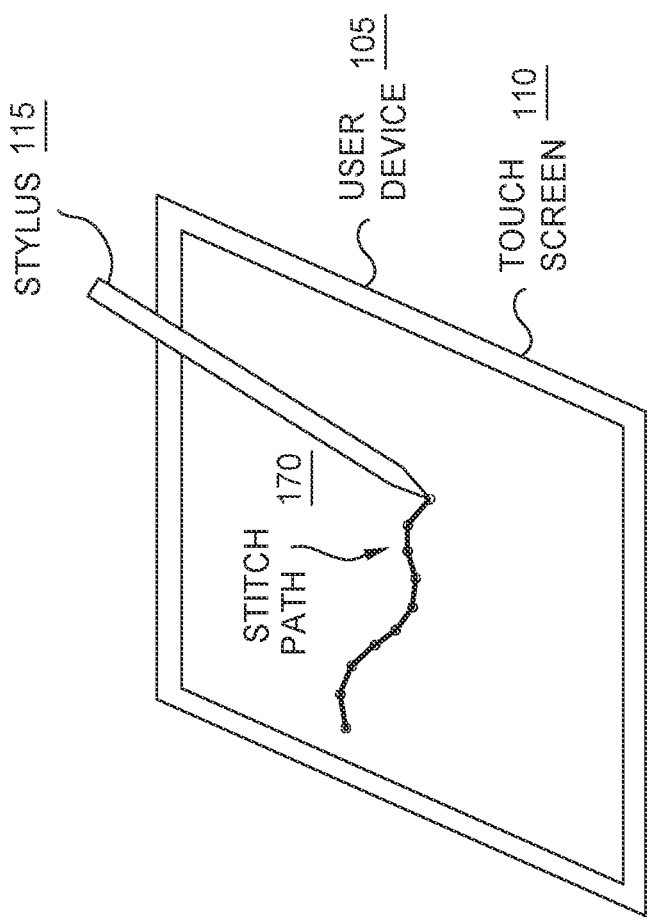
FIG. 1

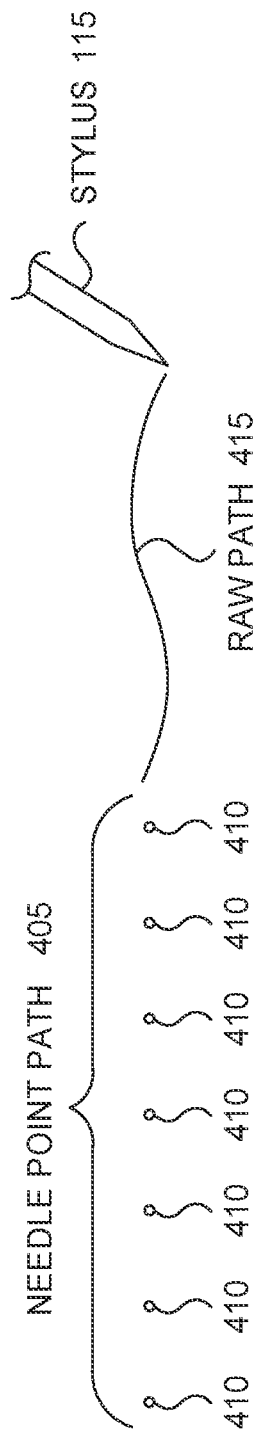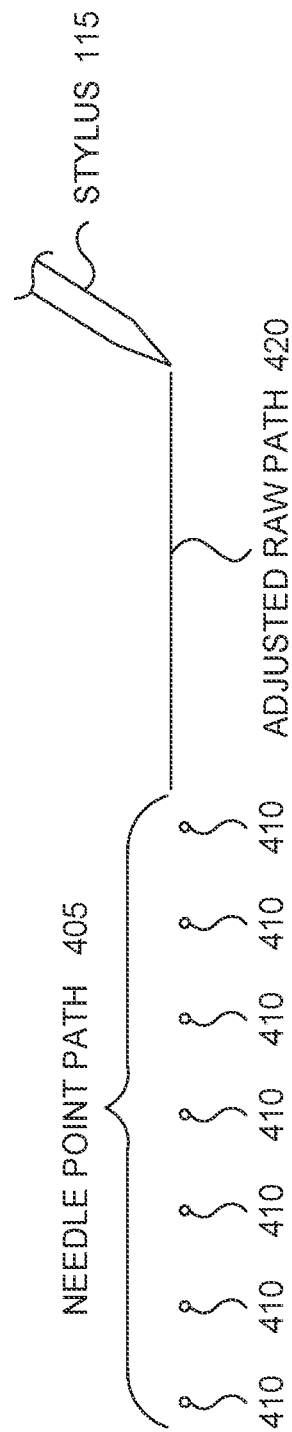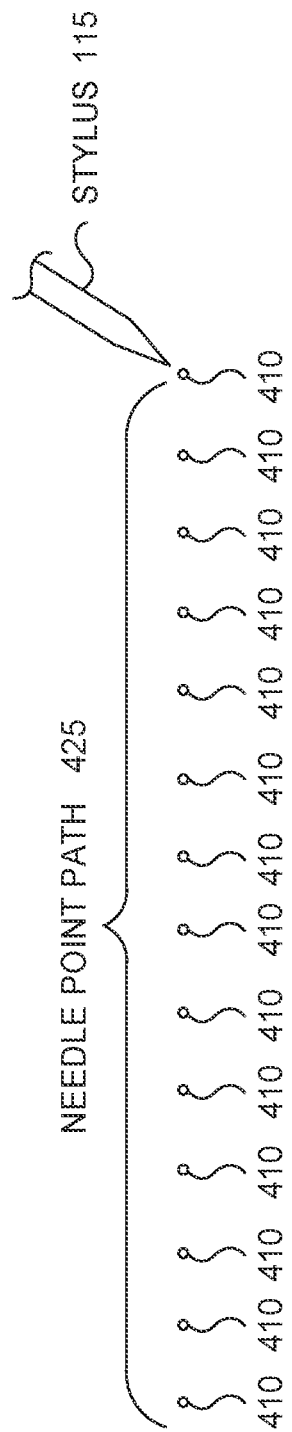

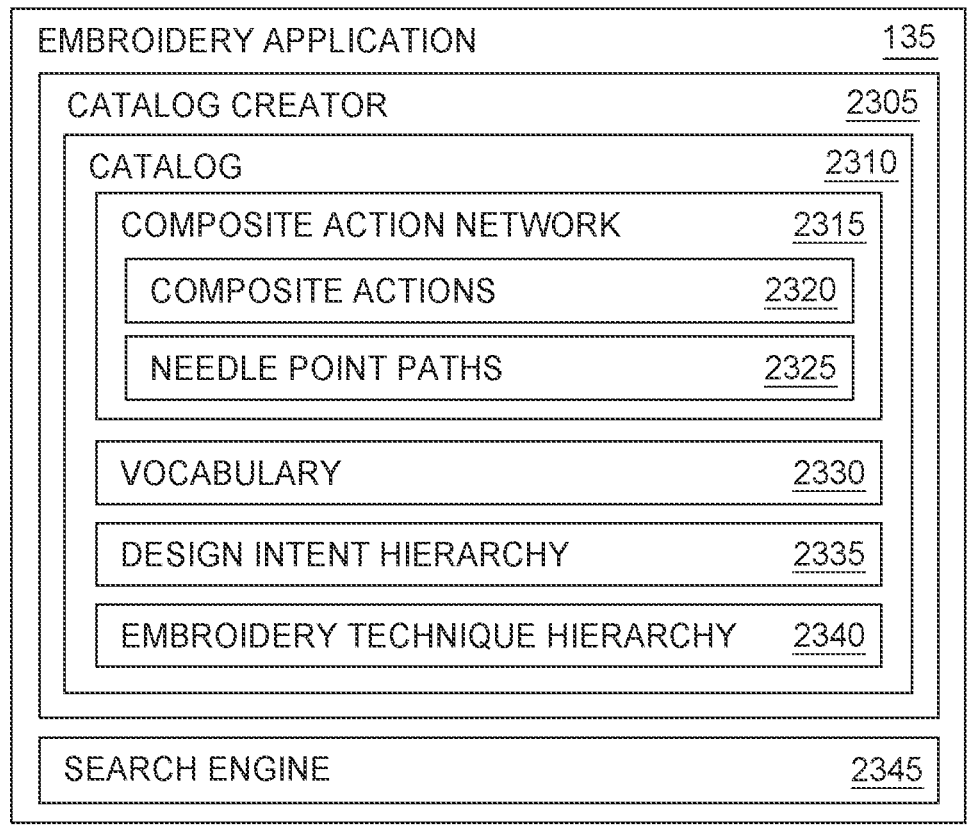
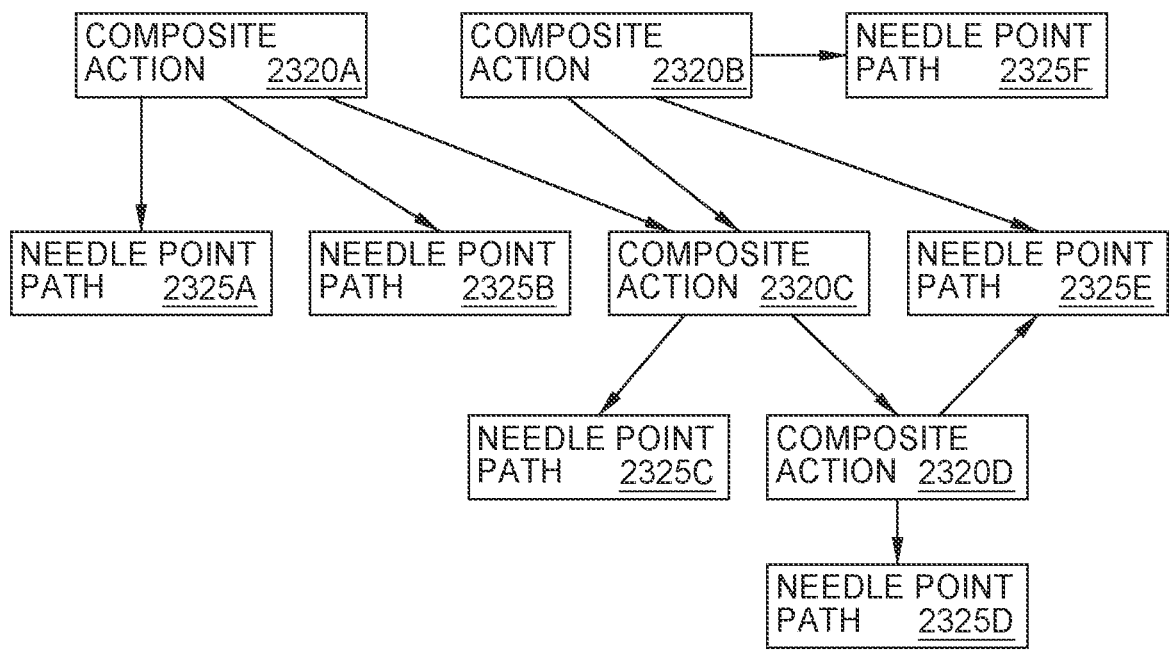
FIG. 23

EMBROIDERY COMPOSITE ACTION CATALOG AND SYSTEMS AND METHODS OF SEARCHING THE SAME

BACKGROUND

There are two primary ways for embroidering designs into fabric or other materials using an embroidery machine. The first way is a manual procedure where a skilled artisan manipulates hooped fabric around a stationary needle of an embroidery machine. The second way uses an embroidery machine file that lists the needle or stitch points as well as jump stitches. The embroidery machine either has a moveable needle or can control the underlying hooped material to move it according to the needle points. When reaching a jump stitch, a technician can then cut the thread so the embroidery machine can then move to the next needle point.

While using an embroidery machine file typically requires less skill to produce the embroidery design, generating the embroidery machine file is a cumbersome process. The embroidery machine file may have to be generated manually by a programmer defining the needle points. Other solutions have explored converting graphical images into an embroidery machine file, but digital graphical primitives (e.g., circles, squares, layers, etc.) are ill-suited to be converted into linear, needle point paths which make up typical embroidery designs.

SUMMARY

One embodiment described herein is a method that includes providing a catalog of embroidery designs, the catalog comprising a composite action network containing a plurality of composite actions linked together, each of the plurality of composite actions defining one of the embroidery designs; establishing a vocabulary for the catalog, the vocabulary comprising a source of words for describing the embroidery designs defined by the plurality of composite actions; establishing a design intent hierarchy for the catalog, the design intent hierarchy comprising a plurality of design intents linked together at different levels, wherein the plurality of design intents describes the embroidery designs; establishing an embroidery technique hierarchy for the catalog, the embroidery technique hierarchy comprises a plurality of embroidery techniques linked together using different levels where the plurality of embroidery techniques describes types of embroidery used in the embroidery designs; receiving a search query; searching the catalog by comparing the search query to the vocabulary, the design intent hierarchy, and the embroidery technique hierarchy to identify a composite action of the plurality of composite actions that matches the search query; and transmitting for display the composite action that matched the search query.

Another embodiment described herein is non-transitory computer-readable medium containing computer program code that, when executed by operation of one or more computer processors, performs an operation. The operation includes providing a catalog of embroidery designs, the catalog comprising a composite action network containing a plurality of composite actions linked together, each of the plurality of composite actions defining one of the embroidery designs; establishing a vocabulary for the catalog, the vocabulary comprising a source of words for describing the embroidery designs defined by the plurality of composite actions; establishing a design intent hierarchy for the catalog, the design intent hierarchy comprising a plurality of design intents linked together at different levels, wherein the plurality of design intents describes the embroidery designs; establishing an embroidery technique hierarchy for the catalog, the embroidery technique hierarchy comprises a plurality of embroidery techniques linked together using different levels where the plurality of embroidery techniques describes types of embroidery used in the embroidery designs; receiving a search query; searching the catalog by comparing the search query to the vocabulary, the design intent hierarchy, and the embroidery technique hierarchy to identify a composite action of the plurality of composite actions that matches the search query; and transmitting for display the composite action that matched the search query.

Another embodiment described is a method that includes providing a catalog of embroidery designs defined by a plurality of composite actions where the catalog is associated with a design intent hierarchy comprising a plurality of design intents linked together at different levels, where the plurality of design intents describes the embroidery designs, where the catalog is associated with an embroidery technique hierarchy comprising a plurality of embroidery techniques linked together using different levels, where the plurality of embroidery techniques describes types of embroidery used in the embroidery designs; receiving a search query of the catalog; determining that text in the search query matches a design intent in the design intent hierarchy; collecting a first set of composite actions in the plurality of composite actions that have the matched design intent; determining that text in the search query matches an embroidery technique in the embroidery technique hierarchy; collecting a second set of composite actions in the plurality of composite actions that have the matched embroidery technique; and transmitting for display the first and second sets of composite action as results of search query.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

FIG. 1 illustrates a user device for generating an embroidery machine file using a stylus, according to one embodiment.

FIGS. 4A-4C illustrate converting a raw path into a needle point path, according to one embodiment.

FIG. 23 is a block diagram of the embroidery application which includes a searchable catalog, according to one embodiment.

DETAILED DESCRIPTION

Figure 2:
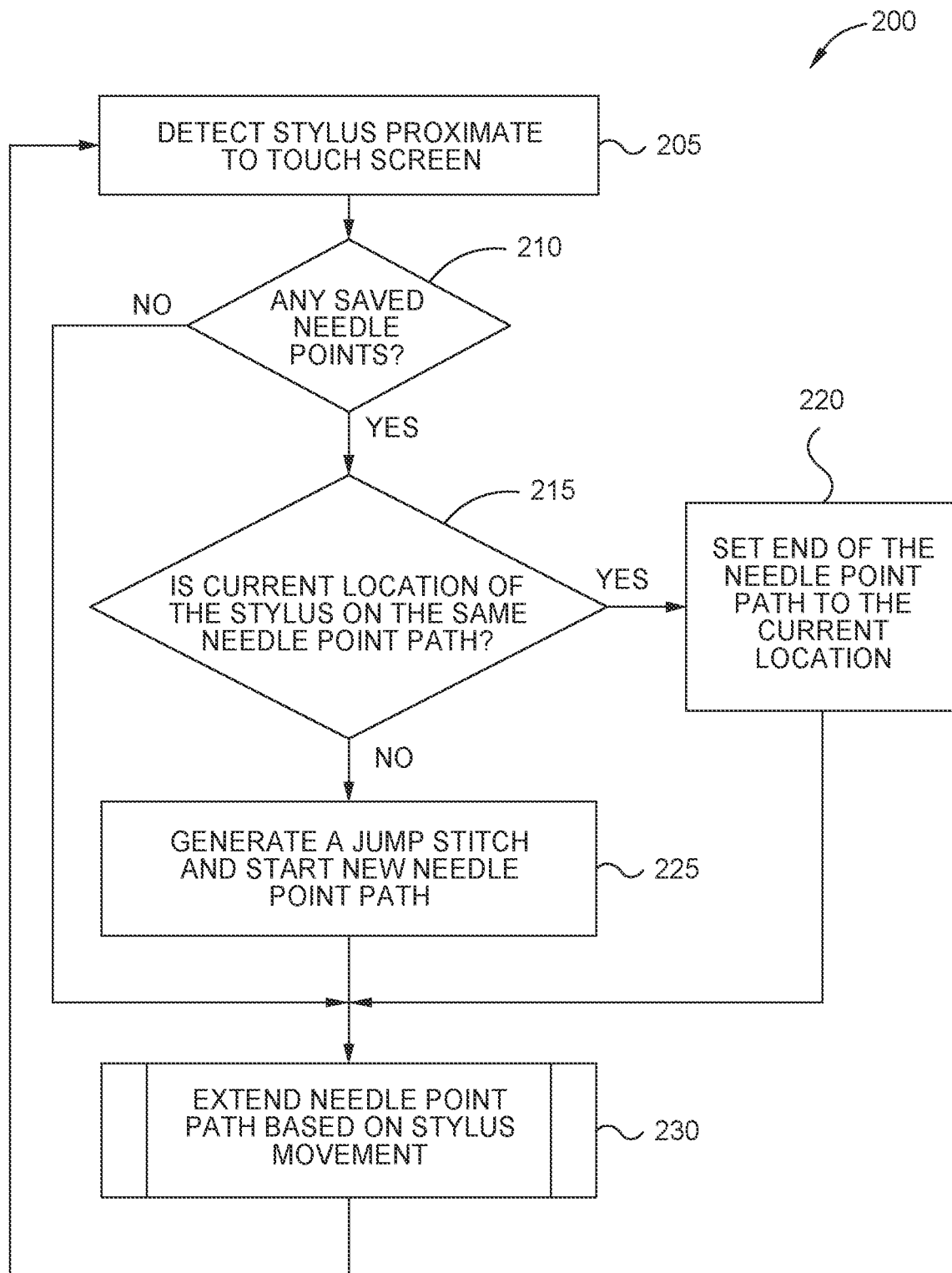
FIGS. 2 and 3 are flowcharts for converting the movement of a stylus into needle point paths, according to one embodiment.

Embodiments herein describe creating a searchable catalog of composite actions for embroidery designs. A user can then edit or combine these composite actions to generate different embroidery designs. A composite action can include a needle point path and other composite actions (referred to herein as child composite actions). In one embodiment, each composite action defines a tree structure formed by the needle point path(s) and child composite actions, if any. A child composite action serves as a branch in the tree while the needle point paths serve as terminals (or leafs) of the tree.

To make the catalog more searchable, the catalog can store a design intent and the embroidery technique for each of the composite actions. The design intent can be a user-provided description of the embroidery design defined by a composite action—e.g., animals, side view of cats, sunset, Easter, and the like. The embroidery technique can associate the composite action with a particular type of embroidery (e.g., Redwork embroidery, Counted Thread embroidery (which includes Blackwork and Cross stitch), Outline embroidery, Whitework embroidery, Candlewicking embroidery, and the like). The catalog can then link the needle point paths in the composite action to the design intent and embroidery technique for that action.

In one embodiment, the catalog can be searched using a text based search, an image search, or both. A text search can search the design intents, embroidery techniques, annotations, and synonyms related to the composite actions in the catalog to identify composite actions that are relevant to the search. To perform an image search, the user may provide a needle point path as the search term. The system can then use image recognition to identify needle point paths in the catalog that are similar to the user-provided needle point path. In one embodiment, the search results are ranked and then output to the user. Further, because the needle point paths in the catalog are annotated, the catalogs can be used a training data for machine learning (ML) model which can then be used to perform searches using graphic images as inputs.

FIG. 1 illustrates a user device 105 for generating an embroidery machine file 155 using a stylus 115, according to one embodiment. The left of FIG. 1 illustrates a user device 105 (e.g., a smart phone or tablet) where a user is currently using the stylus 115 to create a stitch path 170 in a touch screen 110. While the user device 105 is shown as a smartphone or tablet, the user device 105 can be a laptop or any other computing device with a touch screen 110. Further, in one embodiment, the user device 105 may be part of a kiosk that integrates an embroidery machine with the functions and components illustrated in FIG. 1. For example, a user may use a touch screen 110 at the kiosk to draw an embroidery design using the techniques discussed below, and then the embroidery machine at the kiosk can embroider the design on a fabric of the user's choice. Thus, the components shown in FIG. 1 can be integrated into a system that includes an embroidery machine.

The touch screen 110 enables the user device 105 to track the movement of the stylus 115. Using the embodiments described herein, the user device 105 can display the stitch path 170 along the path of the stylus 115. This stitch path 170 can appear visually like thread used to form the embroidery design. Thus, the user can see exactly what the embroidery design formed from the stitch path 170 (or multiple stitch paths) will appear like when formed on fabric or other material. However, it is not a requirement that the user device 105 display a stitch path 170 with the appearance of thread and stitches. In other embodiments, the user device 105 may trace out a simple line to indicate the embroidery design. Further, while a stylus 115 is shown, other input elements can be used to generate the stitch path 170 such as the user's finger or other input devices.

The right side of FIG. 1 illustrates various components in the user device 105. In this embodiment, the user device 105 includes the touch screen 110, a processor 120, and memory 125. The processor 120 represents any number of processing elements that can each include one or more processing cores. The memory 125 can include volatile memory elements, non-volatile memory elements, and combinations of both. Further, while the processor 120 and memory 125 are shown in the user device 105, some of the embodiments discussed herein can be performed on other computing devices, such as in a cloud computing environment or a data center.

The memory 125 includes a tracker 130 which may be an application executing in an operating system (OS) that tracks the movement of the stylus (or any other input element) along the touch screen 110. This tracking information can then be used by an embroidery application 135 to form the stitch path 170 which is then displayed on the touch screen 110.

The embroidery application 135 includes a point generator 140, a convertor 150, and an optimizer. The point generator 140 uses the tracking information provided by the tracker 130 to generate needle points 140. These needle points 140 can then be used to render the stitch path 170 on the touch screen 110. As discussed in more detail below, the point generator 140 can convert the path of the stylus 115 into a series of needle points 145. These needle points 145 can be used to form one or more needle point paths which define the embroidery design.

The convertor 150 uses the needle points 145 to generate an embroidery machine file 155. In addition, the embroidery application 135 can provide jump stitches to the convertor 150. With this information, the convertor 150 can generate the embroidery machine file 155 which provides instructions to an embroidery machine to generate the embroidery design. As an example, the converter 150 can use the needle points 145 and the jump stitches to generate an embroidery machine file 155 that instructs the embroidery machine to move to a first location along a plane, make a stitch, move to a second location along a plane, make a stitch, move to third location along the plane, make a stitch, and so forth until reaching a stopping point which can be a location where the technician needs to cut the thread so the machine can move to a different location (e.g., a jump stitch), change threads to a different color, or the embroidery is finished. The stitch locations and the stopping locations can correlate to the needle points 145 and the jump stitches.

An example of an embroidery machine file 155 is a Data Stitch Tajima® (DST) file format (Tajima® is a registered trademark of Tokai Industrial Sewing Machine CO., LTD.). However, this is just one example. Different embroidery machine manufactures often have their own proprietary file formats, but generally have the same common elements such as defining locations for the stitches as well as stopping locations for moving to a different location, changing thread, etc. Thus, the embodiments herein can be used with a variety of different embroidery machine formats to generate embroidery machine files.

The optimizer 160 can optimize the needle points 145 and the jump stitches before the convertor 150 generates the embroidery machine file 155. Often, when drawing the embroidery design using the stylus 115, the user will create needle point paths that, if directly converted into instructions for the embroidery machine file 155 may be inefficient. For example, assume the user draws a horizontal line, moves the stylus 115 to a different location of the touch screen 110, and draws a vertical line that then connects to the end of the horizontal line. If the embroidery machine file 155 instructs the embroidery machine to mimic the user's actions, the machine while stitch the horizontal line, reach a stopping point to permit the technician to cut the thread, moves to the beginning of the vertical line, and then stitches the vertical line to connect to the end of the horizontal line. Using the techniques described herein, the optimizer 160 can recognize the two lines can be combined into a single line. Instead of mimicking the user's actions, the optimized embroidery machine file 155 can instruct the embroidery machine to make the horizontal line and then immediately begin making the vertical line without a jump stitch. Details of optimizing the needle point paths is discussed in FIGS. 5-6.

FIG. 2 is a flowchart of a method 200 for converting the movement of a stylus into needle point paths, according to one embodiment. The method 200 assumes that the embroidery application is performing a new project where there is no current needle point list. However, the method 200 can also be used to add to an embroidery project that has already been created. In that example, an existing embroidery machine file can be converted into a needle point list. The embroidery application can then add needle points to this list using the method 200.

At block 205, the tracker (e.g., the tracker 130 in FIG. 1) detects a stylus proximate to the touch screen. While the method 200 describes tracking a stylus, any input element can be used such as a finger or other input device. Further, the tracker may track the stylus while it contacts or hovers above the touch screen. Thus, direct contact is not required in order to track the location of the stylus.

At block 210, the point generator (e.g., the point generator 140 in FIG. 1) determines whether there are any saved needle points. If this is the first time the user has begun to draw on the touch screen, then the point generator has not yet identified any needle points for the embroidery design. Put differently, the point generator has not yet created any needle points for this project. In that case, the method 200 proceeds to block 230 where the point generator 140 extends, or in this case, starts a needle point path based on stylus movement. The details of block 230 are discussed in FIG. 3.

In contrast, if the user has previously moved the stylus and the point generator has identified needle points for the embroidery design, the method 200 proceeds to block 215 where the point generator 140 determines whether the current location of the stylus is on the same needle point path. As the user moves the stylus, the point generator creates needle points that define the needle point path. In one embodiment, so long as the user does not lift up the stylus and place it at a different location on the touch screen, the point generator determines at block 215 that the current location of the stylus is on the same needle point path (e.g., the location of the stylus is at, or near, the end of the needle point path). Or if the user has opened a previously saved embroidery design, the point generator determines whether the current location is at (or near) the end of a needle point path that was already part of the embroidery design.

If the stylus is on the same needle point path, the method 200 proceeds to block 220 where the point generator sets the end of the needle point path to the current location of the stylus. That is, the movement of the stylus to its current location is added as the end point of the needle point path. However, the needle point path does not have needle points that extend to the new end of the path (i.e., the current location of the stylus). Thus, the method 200 then proceeds to block 230 where the point generator extends the needle point path to the end point. That is, the point generator adds additional needle points so that the needle point path extends to the current location of the stylus. The method 200 can be repeated at intervals (e.g., every time the tracker identifies the stylus has moved on the touch screen, or at predefined time intervals) to extend the needle point path.

Returning to block 215, if the point generator determines that stylus is not on the same needle point (e.g., the user has picked up and moved the stylus to a different location on the touch screen), the method 200 proceeds to block 225 where the point generator generates a jump stitch and starts a new needle point path. For example, the embroidery design may include multiple needle point paths that are connected by jump stitches. Thus, the method 200 can be repeated to extend a needle point path as well as create new needle point paths.

Figure 3:
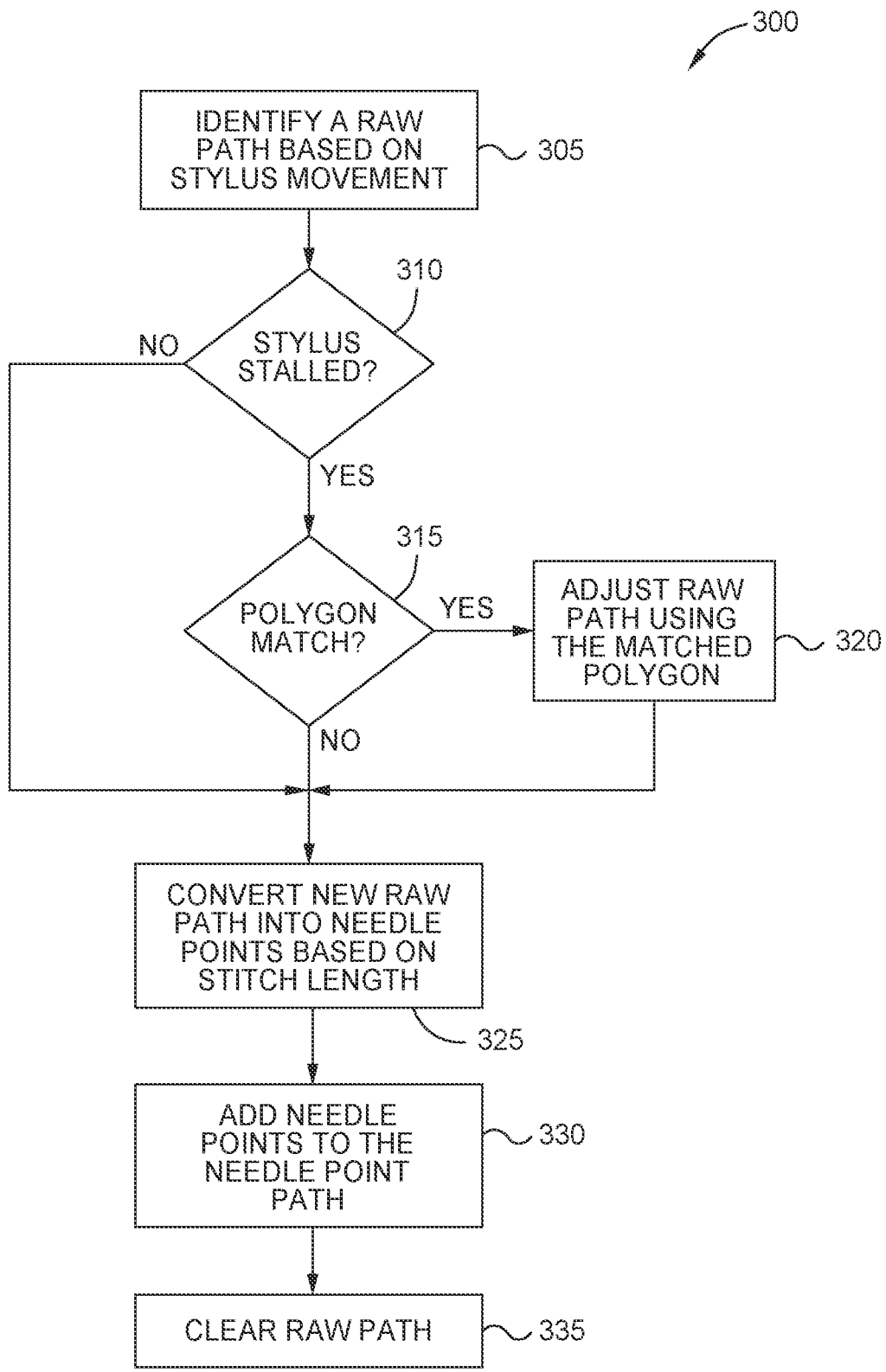

FIG. 3 is a flowchart of a method 300 for converting the movement of a stylus into needle point paths, according to one embodiment. The method 300 is called at block 230 of FIG. 2 where the user is extending a current needle point path or is starting a new needle point path based on the user moving the stylus to a new location (or starting a new embroidery design).

At block 305, the tracker identifies a raw path based on the movement of the stylus. That is, the tracker identifies a path traveled by the stylus. The tracker may use any technique for identifying the raw path such as listing points (e.g., locations on the touch screen) to indicate the path the stylus moved since the last time the point generator updated the needle point path. The method 300 can then be used to convert this raw path (which was identified by the tracker) into needle points that can be added to the needle point path.

At block 310, the point generator determines whether the stylus has stalled. The user may stop moving the stylus for many reasons, such as evaluating what she has drawn already, or to take a break. In this embodiment, the user can also stop moving the stylus to indicate she has completed a polygon (i.e., a predefined geometric shape) such as a line, circle, ellipse, rectangle, triangle, etc. For example, when drawing a polygon, the user may pause (e.g., stall) which tells the point generator to evaluate the raw path and the needle point path to determine whether the user has drawn a polygon.

Many operating systems have polygon recognition techniques for evaluating lines drawn by the user to determine whether they match a predefined polygon. The point generator can wait for the user to pause and then call a polygon recognition technique to determine whether the path drawn by the user (e.g., the raw path, or a combination of the raw path and the needle point path) matches a polygon. For example, at block 315, the point generator can use a polygon recognition technique to determine whether the path drawn by the user matches a polygon. If so, the method 300 proceeds to block 320 where the point generator adjusts the raw path using the matched polygon. For example, the point generator or the tracker can adjust the points used to form the raw path so they form the shape of the polygon. As an example, the user may draw a path that forms a square, but the user most likely will not draw perfectly straight sides, or perfect ninety degree corners. However, once the polygon recognition technique determines the user intended to draw a square, the point generator can adjust the raw path (and the points in the needle point path) so it forms a perfect square. In this manner, the user can hand draw paths that approximate ideal polygons. The user drawn path can then be replaced by an adjusted path that matches the polygon.

One advantage of using polygon matching to adjust the raw path and needle point path is that it avoids using digital image primitives to generate the embroidery machine file. As discussed in the background section, it is difficult if not impossible to convert digital image primitives into linear, needle point paths which make up typical embroidery designs. The methods 200 and 300 avoid using digital image primitives and instead use polygon matching to adjust hand drawn paths. That is, instead of the user starting with digital image primitives (e.g., squares, layers, circles) to create the design, they first hand drawn the design. Although this introduces inaccuracies into the design since humans cannot typically hand draw perfect polygons, a polygon matching technique can be used to adjust the hand drawn path to mimic a perfect polygon, again without using digital image primitives.

After performing polygon matching (or if at block 310 the stylus was not stalled, or at block 315 there are no matching polygons), the method proceeds to block 325 where the point generator converts the raw path into needle points based on a stitch length. The stitch length can define a minimum spacing between the needle points (or stitches) forming the needle point path. Alternatively, the needle points can be set based on the speed of the stylus when traveling along the raw path. For example, some techniques may space the needle points closer together the slower the stylus moves, while spreading the needle points farther apart as the stylus increases speed. However, the user may move the stylus slowly because she is at a particular tough part of the design or because she is being careful rather than intending to create a cluster of needle points at a particular portion of the path. By using a predefined stitch length, the placement of the needle points can be decoupled from the speed of the stylus, and thus, avoid having too many, or too few needle points along a portion of the path.

At block 330, the point generator adds the needle points formed from the raw path to the needle point path. That is, the end of the needle point path may intersect with the beginning of the raw path. Thus, the needle points from the raw path can be used to extend the needle point path.

In one embodiment, the point generator may maintain a data structure that includes the needle points forming the needle point path. After converting a raw path into needle points, the locations of these needle points can be added to the data structure or the needle point path.

At block 335, the point generator or tracker clears the raw data path. The method 300 can then return to method 200 where the tracker continues to track the location of the stylus on the touch screen where the method 200 can repeat and call the method 300 to extend a current needle point path or add a new needle point path.

FIGS. 4A-4C illustrate converting a raw path into a needle point path, according to one embodiment. That is, FIGS. 4A-4C illustrate one example of blocks 305-330 of the method 300 where a raw data path is converted into needle points that are then added to an existing needle point path.

FIG. 4A illustrates a needle point path 405 defined by a series of needle points 410 and a raw path 415 that were formed by the movements of the stylus 115. That is, both the needle point path 405 and the raw path 415 illustrate previous locations of the stylus 115 as it moved along the touch screen (without being lifted up). However, the needle point path 405 illustrates a portion of the path of the stylus 115 that has already been converted into needle points 410 using the methods 200 and 300 discussed above. In contrast, the raw path 415 illustrates a portion of the path of the stylus 115 which has been identified by the tracker but has not yet been converted into needle points 410 using the method 300.

In FIG. 4A, it is assumed that the stylus 115 is stalled at its current location. As discussed in the method 300, this can trigger the point generator to call a polygon recognition technique to determine whether the raw path 415 matches a predefined polygon. In this embodiment, the point generator evaluates only the raw path because the needle point path 405 may have already been matched to a polygon. However, in other examples, the polygon matching technique may also use consider the needle point path 405 when determining whether the raw path 415 matches a predefined polygon.

As shown, the raw path 415 includes curves, but the polygon matching technique may determine those curves are within a tolerance or variance indicating that the user intended to draw a straight line. Put differently, the polygon matching technique determines the curves where unintentional and the raw path 415 matches a straight line (i.e., the raw path is substantially similar to a straight line).

FIG. 4B illustrates the point generator generating an adjusted raw path 420 so the path 420 now matches the polygon (i.e., the straight line). In one embodiment, the polygon matching technique considers the shape of the needle point path 405 when determining to adjust the raw path. For example, because the needle point path 405 is a straight line, this may influence the decision by the polygon matching technique whether the user intended to draw the raw path 415 as a straight line.

FIG. 4C illustrates converting the adjusted raw path 420 into needle points 410. These needle points 410 are then added or appended into the needle point path 425. In one embodiment, the adjusted raw path 420 is converted into needle points 410 using a defined stitch length so that the spacing between the needle points 410 are equidistant. However, different geometric shapes may use different spacing such that the spacing between the needle points is not the same. For example, to make a corner of a square, the point generator may place a needle point at the corner, even if that violates the stitch length (e.g., the needle point at the corner is closer to a neighboring needle point than the stitch length).

Further, the user may desire to set the spacing of the needle points 410 based on the speed of the stylus rather than using a stitch length. For example, the embroidery application may provide an option for the user to select whether to use the speed of the stylus or the stitch length to set the spacing between the needle points 410.

In addition, the embroidery application can provide other options to the user such as an undo feature (e.g., a backup feature) and a restore feature. For example, assume that the user did not intend for the raw path 415 to be a straight line, but rather wanted it to remain curved. The user can touch, click, or press a button that instructs the embroidery application to undo the last action it took (e.g., adjusting the raw path 415 to form the adjusted raw path 420). Moreover, if the user drew the raw path 415 in the wrong location, she can use the undo feature to discard the raw path 415. The user can then move the stylus 115 to the end of the needle point path 405 in FIG. 4A and redraw a raw path in the desired location or with a desired shape.

When undoing an action, the embroidery application can store that action in a history. Thus, if the user changes her mind, she can touch, click, or press a button that restores the action using the history. In this manner, as the user undoes multiple actions, she can also restore those actions using the history (e.g., redraw the raw path 415 or readjust the raw path 415 to form the adjusted raw path 420 based on polygon matching). In one embodiment, once the user performs a new action, the actions stored in the history are cleared.

Figure 5:
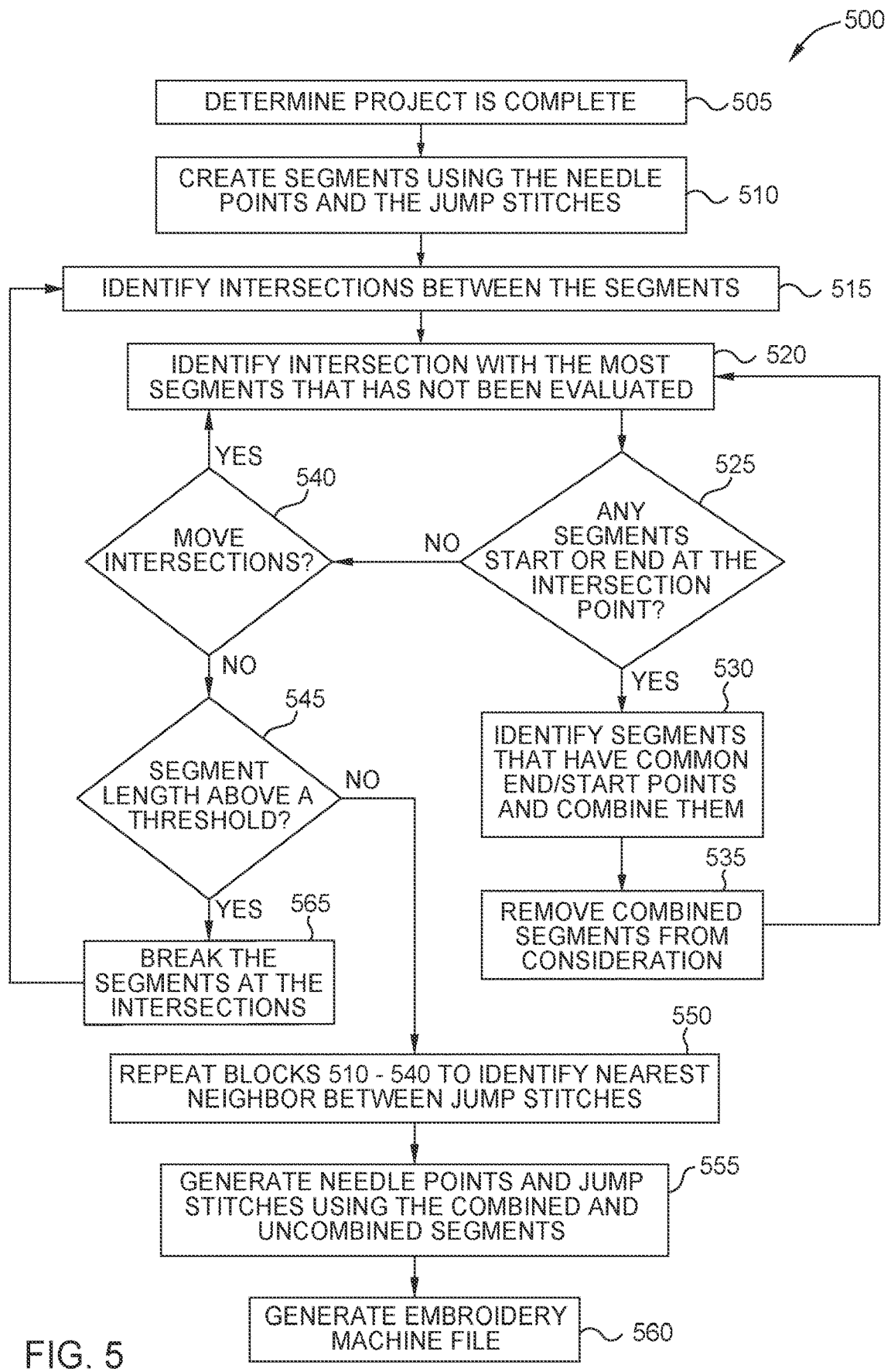
FIG. 5 is a flowchart for optimizing needle point paths, according to one embodiment.

FIG. 5 is a flowchart of a method 500 for optimizing needle point paths, according to one embodiment. Once the user is done with an embroidery design, the user can be presented with an option to optimize the design before the embroidery application converts the needle point path(s) and jump stitch(es) into an embroidery machine file. For example, when drawing the needle point paths, the user may not have used optimal paths which would reduce the number of jump stitches, and thus, reduce the number of times a technician has to cut the thread so the embroidery machine can resume the design at a different location. The method 500 can be used to combine the needle paths to reduce the number of different needle point paths, and thus, the number of jump stitches in the embroidery design. Further, the method 500 can identify the nearest segments to reduce the distances between each of the jump stitches, which can further reduce the time required to produce the embroidery design.

At block 505, the optimizer (e.g., the optimizer 160 in FIG. 1) determines a project is complete and the user has instructed the embroidery application to optimize the design.

At block 510, the optimizer creates segments using the needle points and the jump stitches. That is, the different needle point paths created using the methods 200 and 300 can be temporary converted into segments which can be lines or shapes. The different jump stitches can be used to identify the different segments.

At block 515, the optimizer identifies intersections between the segments. That is, the optimizer can identify each location where a two segments intersect (e.g., have a point in common).

At block 520, the optimizer identifies the intersection with the most segments running through it, which has not yet been evaluated. That is, each intersection can define a point where two, three, four, or more segments meet. If this if the first iteration of the method 500, then at block 520, the optimizer selects the intersection with the most segments that meet at that point.

At block 525, the optimizer determines whether any of the segments corresponding to the intersection start or end at the intersection point. That is, some of the segments may cross through the intersection while other segments may start or end at the intersection point.

Assuming at least one segment starts or ends at the intersection, the method proceeds to block 530 where the optimizer identifies segments that have common end and starts points and combines them. In one embodiment, the optimizer selects one of the segments that starts or ends at the intersection point and determines whether there are any other segments that have a common end or start point with that segment. If so, the segments are combined and the optimizer can determine if there are any other segments that have common start or end points of the combined segment, and if so, combine them. This search can continue until there are no other segments that meet this criterion. The optimizer can continue to evaluate other segments that start or end at the intersection point to see if those segments can be combined with other segments.

At block 535, the optimizer removes from consideration the segments that were combined at block 530. The method 500 then returns to block 520 to identify the intersection with the second most segments that meet or cross at its location.

If at block 525 an intersection does not have any segments that end or start at its location, the method proceeds to block 540 where the optimizer determines whether there are any other intersections identified at block 515 that have not yet been evaluated. If so, the method returns to block 520 to evaluate those intersections.

Assuming all the intersections have been evaluated, the method 500 proceeds to block 545 where the optimizer determines whether a segment length is above a threshold. That is, the optimizer can evaluate the current lengths of the segments and determine if any are above the threshold. If so, the method 500 proceeds to block 565 where the optimizer breaks the segments at the intersections to form smaller segments. The method 500 then returns to block 515 to identify a new set of intersections using the smaller segments and repeats the above mentioned blocks.

After returning to block 545, if the segments length is less than the threshold, this indicates the segments should not be divided anymore. The optimizer has found all the segments it can combine in order to reduce the number of jump stitches.

The method 500 then proceeds to block 550 to repeat blocks 510-540 to identify the nearest neighbor for the jump stitches. That is, the method 500 can also identify the nearest neighbor between the start and end points of the combined segments. Identifying the closest neighbors can then be used to optimize the order in which the segments should be performed based on which segments have jump stitches closest to each other.

At block 555, the converter (e.g., the converter 150 in FIG. 1) generates needle points and jump stitches using the combined segments and uncombined segments.

At block 560, the converter generates an embroidery machine file using the needle points and the jump stitches identified at block 550. The embroidery machine file can list a series of instructions that, when executed on an embroidery machine, cause the machine to make the needle points in a material (e.g., fabric). Further, the embroidery machine file can have stop instructions corresponding to the jump stitches so a technician can cut the thread so the embroidery machine can resume forming the design at a different location. However, while current machines cannot stop the embroidery design in one location and resume the design in another location without human assistance, further embroidery machines may have this function. In that case, the embodiments herein can still be used to generate the embroidery machine file but instead of using the jump stitches to form stop instructions, the jump stitches can be used to instruct the machine to automatically stop the embroidery design in one location and resume the design in another location.

Figure 6A:
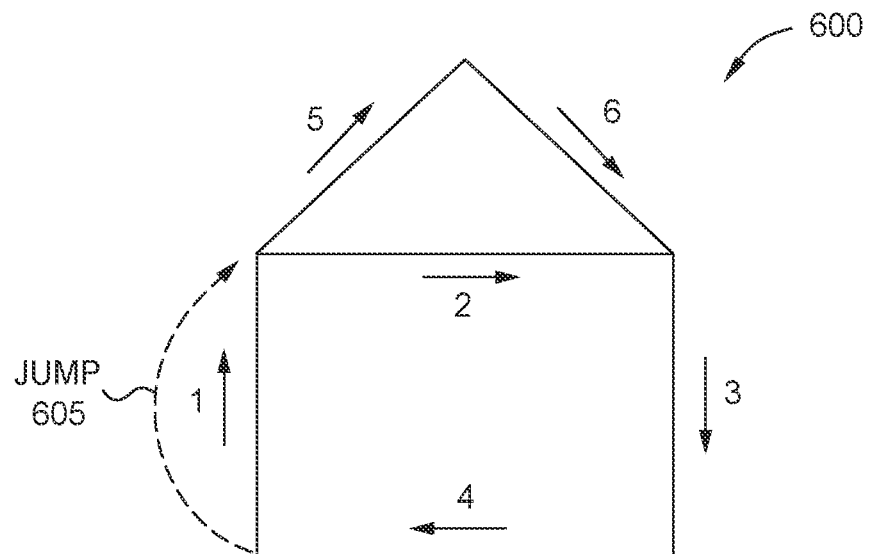
FIGS. 6A and 6B illustrate optimizing needle point paths, according to one embodiment.
Figure 6B:
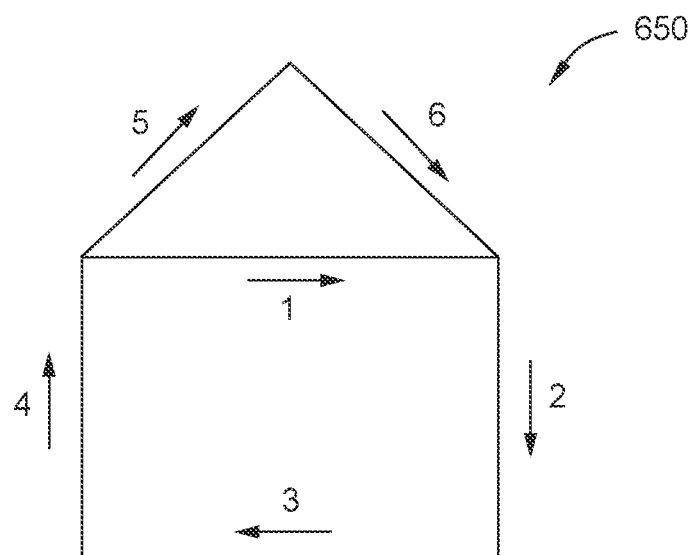

FIGS. 6A and 6B illustrate optimizing needle point paths, according to one embodiment. FIG. 6A illustrates non-optimized paths 600 formed by a user on a touch screen for an embroidery design while FIG. 6B illustrates an optimized path 650 after performing the optimization method 500 in FIG. 5.

FIG. 6A includes six line segments that are drawn in the order shown by the user (Line Segment 1 is drawn first, Line Segment 2 is drawn second, and so forth). The Line Segments 1-4 are drawn without the user lifting the stylus from the touch screen. However, to make Line Segments 5 and 6, the user lifts the stylus from the touch screen after completing Line Segment 4 and then traces the Line Segments 5 and 6. This lifting of the stylus is illustrated by the jump 605. As discussed above in the method 200, the embroidery application can record this jump as a jump stitch at block 225. Thus, the embroidery application would store two needle paths: one formed from the Line Segments 1-4 and another formed from the Line Segments 5 and 6 with the jump stitch between the end of Line Segment 4 and the beginning of the Line Segment 5.

FIG. 6B illustrates the result of performing the method 500. In this case, the Line Segments 1-4 have been combined with the Line Segments 5-6 which creates one needle path and removes the need for the jump stitch. That is, instead of starting the first needle point path at the bottom left corner of the square, the path now starts in the upper left corner of the square (but could also start in the upper right corner). The needle path then proceeds according to the order shown from Line Segments 1-6 without any need to jump from one location to a different location. Thus, when the converter generates an embroidery machine file using the optimized needle path 650, the embroidery machine can complete the entire design without have to stop and wait for a technician to cut the thread (e.g., without performing a jump stitch). Thus, FIGS. 6A and 6B illustrate one example where the method 500 can be used to optimize the needle point paths and jump stitches generated by the user to form optimized needle point paths and jump stitches.

Editing a Needle Point Path

Figure 7:
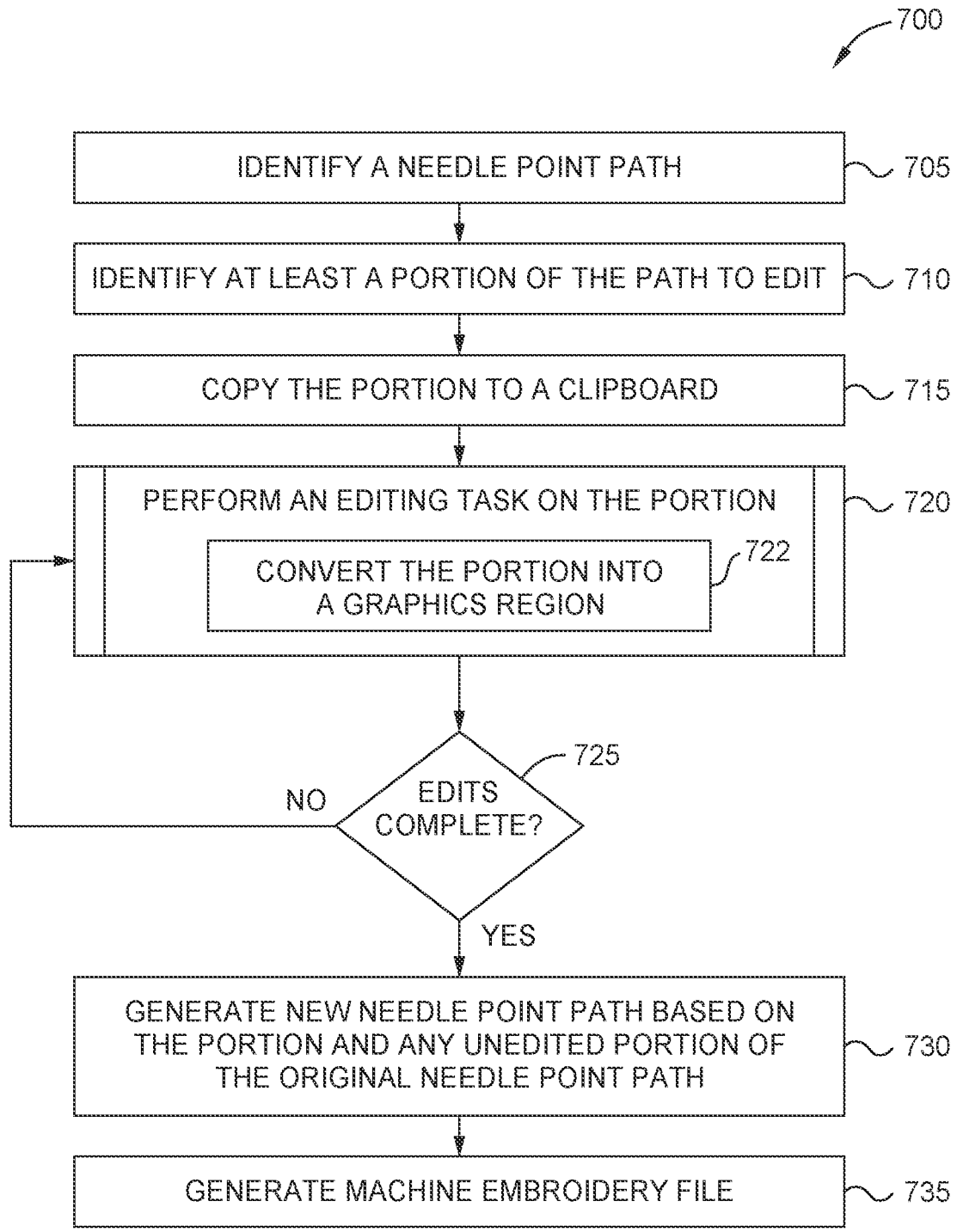
FIG. 7 is a flowchart for editing a needle point path, according to one embodiment.

FIG. 7 is a flowchart of method 700 for editing a needle point path, according to one embodiment. At block 705, the embroidery application (e.g., the embroidery application 135 in FIG. 1) identifies a needle point path. In one embodiment, the user has already used an input element (e.g., a stylus or finger) to draw the needle point path on the user device as described above. However, in another embodiment, the user selects a stored needle point, which is then displayed. In yet another embodiment, the user selects a machine embroidery file to load as the needle point path. However, this file may first be converted into a needle point path. This is discussed in FIG. 14 below.

As discussed above, the needle point path includes X/Y coordinates in a 2D plane corresponding to individual stitches which are separated by a stitch length. The path can also include jump stitches to other needle point paths. In one embodiment, the needle point path is associated with a data structure that provides a name of the path, the defined stitch length, and thread information such as color, manufacture's ID, thread weight, availability of the thread, and the like. For example, this data structure may be created when a drawn needle point path is saved to memory in the user device.

At block 710, the embroidery application identifies at least a portion of the path to edit. In one embodiment, using an input element, the user can select some, or all, of the needle point path to edit. For example, the user may wish to edit only the beginning portion of the path, or only a middle portion, or only the end portion. Alternatively, the user may wish to edit the entire path. Using a stylus, the user can select a portion of the needle path that she wishes to edit.

Figure 8A:
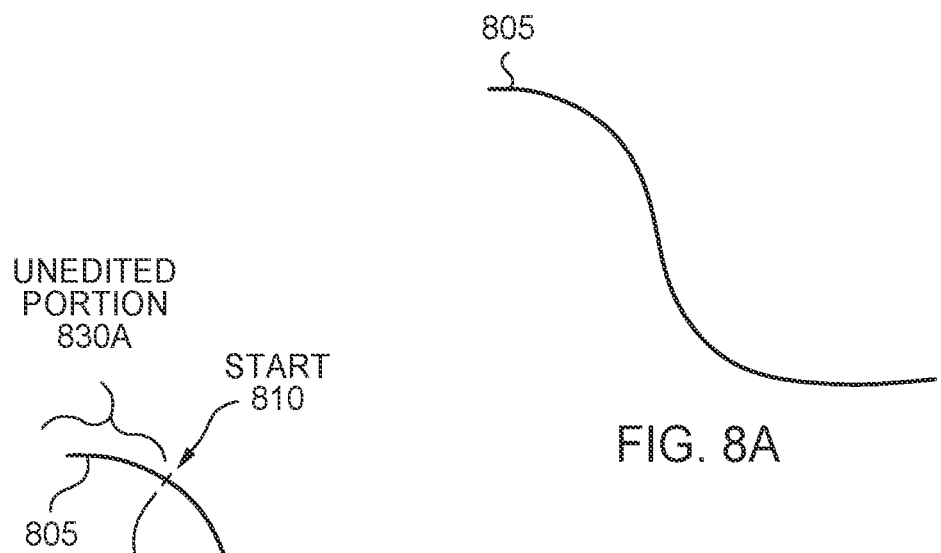
FIGS. 8A-8C illustrate selecting a portion of a needle point path to edit, according to one embodiment.
Figure 8B:
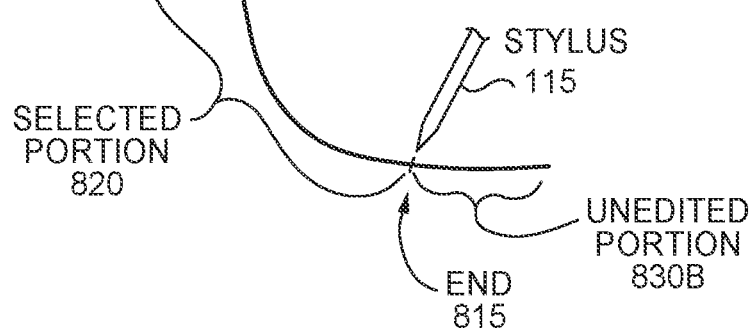
Figure 8C:
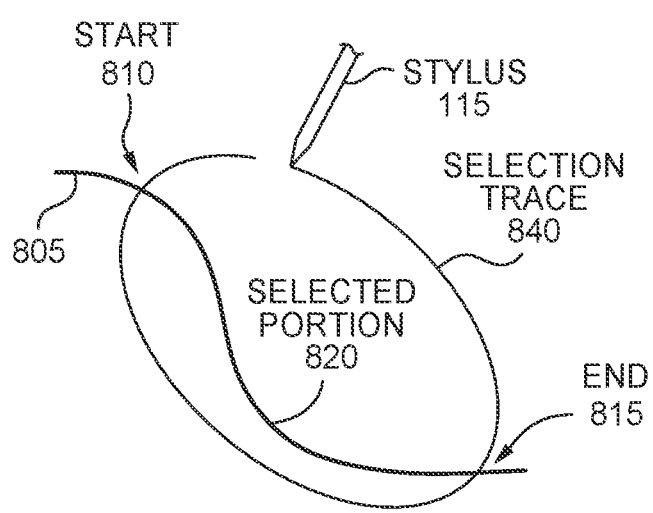

FIGS. 8A-8C illustrate selecting a portion of a needle point path to edit, according to one embodiment. That is, FIGS. 8A-8C illustrate different techniques that a user can use to identify a portion of the needle point path for editing, as discussed at block 710 of FIG. 7.

FIG. 8A illustrates a needle point path 805 which is being displayed on the touch screen of the user device. For clarity, the needle point path 805 is shown as a line, but in other embodiments, the path 805 may look like actual thread that has been stitched into a fabric. In this example, the user wishes to edit only a portion of the path 805 while the remaining portion(s) of the path 805 remain unedited.

FIG. 8B illustrates using the stylus 115 to select a start 810 and an end 815 of a selected portion 820 of the needle point path 805. That is, the user can make slashes or small lines that intersect the needle point path where these slashes indicate to the embroidery application the start 810 and end 815 of the portion of the path 805 the user wishes to edit. As such, the portion of the needle point path between the start 810 and the end 815 is labeled as the selected portion 820 while the remaining portions of the path 805 are labeled as unedited portions 830A and 830B since these portions are not edited during the tasks described below. Put differently, when performing editing tasks, the user cannot change the location or orientation of the unedited portions 830A and 830B. Instead, only the selected portion 820 can be edited by the user.

FIG. 8C illustrates using a different technique to select a portion of the needle point path 805 to edit. In this example, the user moves the stylus to create a selection trace 840 that intersects the needle point path 805 at two locations which serve as the start 810 and the end 815 of the selected portion 820. Thus, the selection trace 840 can be used to identify the selected portion 820, similar to the two slashes shown in FIG. 8B.

The techniques in FIG. 8B and 8C are non-limiting examples of selecting a portion of the needle point path to edit. In another example, the user may set the start and end points by touching the path 805 at two points. Further, the needle point path can have other shapes besides a line. For example, the needle point path may be a complex design such as a rabbit or a house (e.g., the needle point path in FIG. 6B). In those examples, it may be easier to use the technique in FIG. 8C to select a portion of the needle point path to edit since the selected portion may include multiple lines. The user can draw the selection trace 840 through the portion of the design she wants to edit, which may intersect multiple different lines in the needle point path.

Returning to the method 700, at block 710 the embroidery application copies the portion to a clipboard. As discussed in more detail below, adding the selected portion to the clipboard enables certain editing features such as pasting the portion somewhere else in the design or saving the portion for later use.

At block 720, the embroidery application performs an editing task on the selected portion. This task can include moving, rotating, shrinking, enlarging, deleting, or replacing the selected portion. However, it may be difficult for the embroidery application to directly manipulate (e.g., edit) a portion of the needle point path. As mentioned above, the needle point path is a collection of X/Y coordinates indicating the needle points along with jump stitches.

At block 722, the embroidery application converts the portion into a graphics region. In one embodiment, the selected portion is converted into digital graphical primitives (e.g., circles, squares, lines, etc.) which then can be easily manipulated by the operating system of the user device. That is, a user device with a touch screen includes software for manipulating a graphics region containing a digital image. By converting the selected portion of the needle point path into a graphics region, the embroidery application can leverage the software in the operating system to perform the editing task. Once the task is complete, the embroidery application can replot the selected portion as a needle point path. This process is discussed in more detail in FIG. 9.

At block 725, the embroidery application determines whether the user has completed editing the selected portion. For example, the user may press or touch a button to indicate she is finished editing the selected portion. If not, the method 700 returns to perform a different editing tasks as instructed by the user. For example, the user may first resize the selected portion before then rotating the portion by 30 degrees.

Once done editing the selected portion, the method 700 proceeds to block 730 where the embroidery application generates a new needle point path based on the edited portion and any unedited portion of the original needle point path. That is, the embroidery application can generate a new needle point path that now has the edited portion as well as any unedited portions (e.g., the unedited portions 830A and 830B in FIG. 8B). The details of generating the new needle point path are also discussed in more detail below.

At block 735, the embroidery application generates a machine embroidery file using the new needle point path. In one embodiment, as part of generating the embroidery file, the embroidery application can perform the optimization techniques discussed above in FIG. 5. However, these optimization techniques are optional. In any case, the embroidery application generates the embroidery machine file using the needle points and the jump stitches in the new needle point path. The embroidery machine file can list a series of instructions that, when executed on an embroidery machine, cause the machine to make the needle points in a material (e.g., fabric). Further, the embroidery machine file can have stop instructions corresponding to the jump stitches so a technician can cut the thread so the embroidery machine can resume forming the design at a different location.

Figure 9:
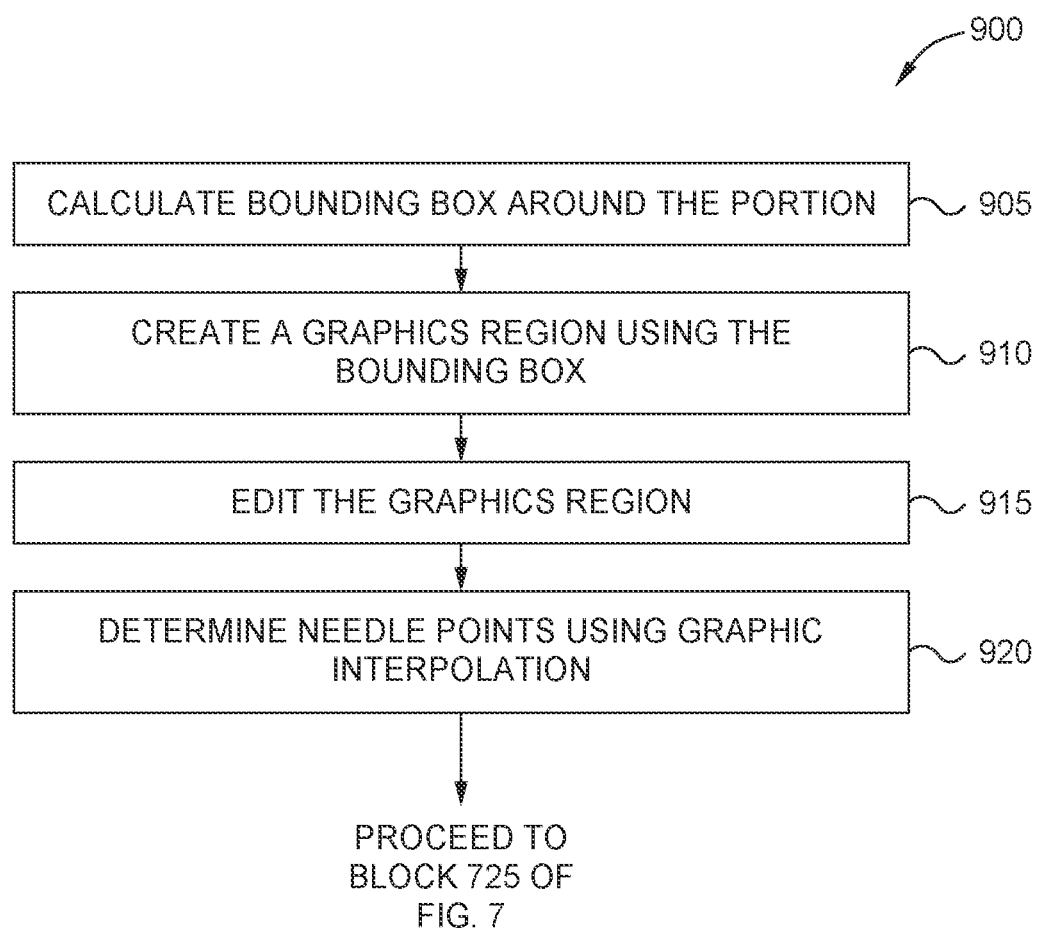
FIG. 9 is a flowchart for editing a selected portion of a needle point path, according to one embodiment.

FIG. 9 is a flowchart of a method 900 for editing a selected portion of a needle point path, according to one embodiment. In one embodiment, the method 900 illustrates further techniques for performing an editing task on a selected portion as discussed at block 720 of the method 700. Put differently, the method 900 illustrates one example of performing an editing task on a selected portion of a needle point path. Thus, the method 900 assumes that the embroidery application has already identified a selected portion of the path based on user input.

Figure 10A:
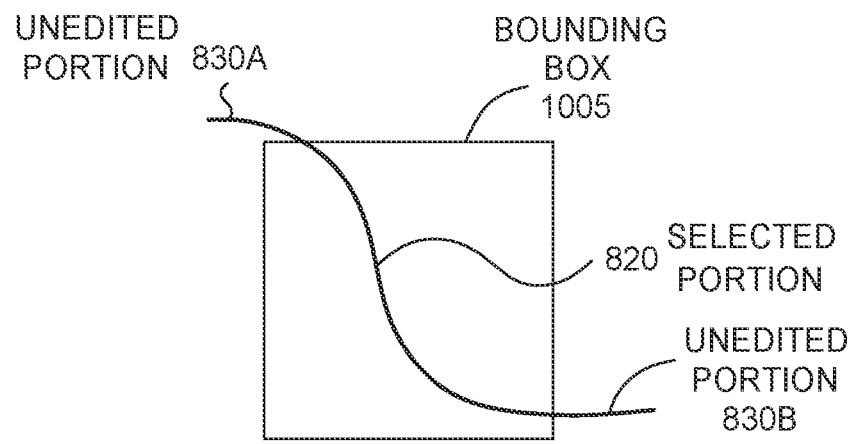
FIGS. 10A-10C illustrate using a bounding box to edit a selected portion of a needle point path, according to one embodiment.
Figure 10B:
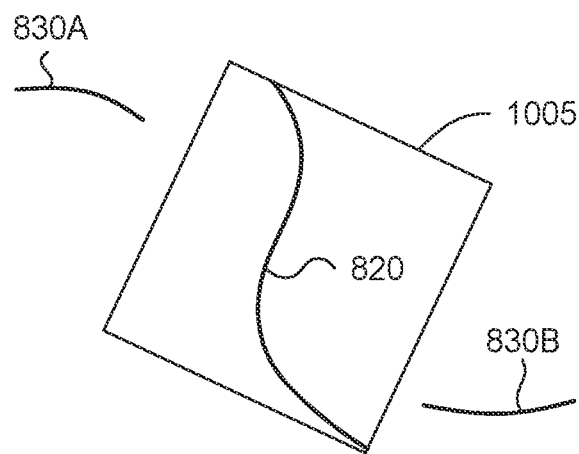
Figure 10C:
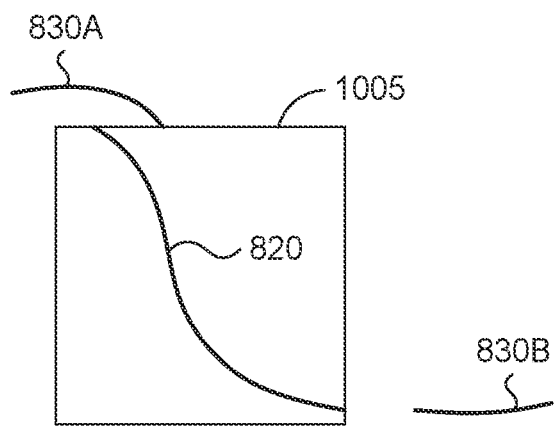

For clarity, the method 900 is discussed in tandem with FIGS. 10A-10C which illustrate using a bounding box to edit a selected portion of a needle point path, according to one embodiment. At block 905, the embroidery application calculates a bounding box around the selected portion of the needle point path. This is shown visually in FIG. 10A where a bounding box 1005 encapsulates the selected portion 820 of the needle point path shown in FIG. 8A. Notably, the bounding box 1005 does not include the unedited portions 830A and 830B of the needle point path. For example, the embroidery application may use the start and end of the selected portion 820 (as shown in FIGS. 8B and 8C) to determine the location of the bounding box 1005 so it encapsulates the selected portion 820.

In one embodiment, the user device displays the bounding box 1005. That is, once the selected portion 820 is identified, the display outputs the bounding box 1005 which is visible to the user. The user can then interact with the bounding box 1005 to edit the selected portion 820 as described below. However, in another embodiment, the bounding box 1005 may be invisible to the user. That is, the bounding box 1005 may be a construct used by the user device to track and manipulate the selected portion 820 without the user ever knowing the bounding box 1005 exists.

At block 910, the embroidery application (or the operating system in the user device) creates a graphics region using the bounding box 1005. As mentioned above, a needle point path may be a data construct that is difficult for the operating system to edit, given it is not a graphical construct (i.e., is not formed from digital graphical primitive (e.g., circles, squares, lines, layers, etc.). However, the bounding box 1005 can be converted into a graphics region that then can be manipulated and edited by the operating system using standard graphical editing techniques. Thus, encapsulating the selected portion of a needle point path by a bounding box and creating a graphics region using that box is one technique for converting the selected portion into a graphics region which can be manipulated using standard graphical editing techniques.

At block 915, the operating system edits the graphics region based on user input. That is, the operating system can use standard editing technique to move, rotate, shrink, enlarge, delete, or replace the graphics region which inherently performs the same action on the selected portion of the needle point path.

FIG. 10B illustrates rotating the bounding box 1005 (which has been used to create a graphics region). For example, the stylus (or a button on the graphical user interface (GUI) displaying the needle point path) can be used to rotate the bounding box 1005 and the selected portion 820 relative to their initial positions shown in FIG. 10A. Notable, the portions of the needle point path not in the bounding box 1005 (i.e., the unedited portions 830A and 830B) have not changed related to their location and size in FIG. 10A.

FIG. 10C illustrates moving the graphics region including the bounding box 1005. In this example, the user has shifted the bounding box 1005 and the selected portion 820 to the left relative to their locations in FIG. 10A. Again, performing this editing task does not affect the unedited portions 830A and 830B.

FIGS. 10B and 10C are just two example editing tasks that can be performed. An operating system can also shrink or enlarge the graphics region containing the bounding box 1005 and the selected portion, delete the graphics region, or perform a combination of editing actions (e.g., shrinking and then moving the graphics region).

At block 920, the embroidery application determines the needle points using graphic interpolation. In one embodiment, the operating system performs graphic interpolation to identify the new position and/or size of the selected portion in the graphics region. That is, graphic interpolation can identify how the selected portion was changed when the graphics region was edited at block 915. With this information, the embroidery application can identify needle points that correspond to the edited selected portion. That is, the embroidery application can identify the needle points (using the predefined stitch distance) that match the edited selected portions 820 shown in FIG. 10B or 10C.

Further, because the selected portions 820 in FIGS. 10B and 10C have been disconnected from the unedited portions 830A and 830B as a result of the editing task, the needle point path can include jump stitches to link the end of the unedited portion 830A to the left end of the selected portion 820 and the right end of the selected portion 820 to the end of the unedited portion 830B. These needle points and jump stitches can then be used by the embroidery application to generate the new needle point path as described at block 730 of FIG. 7.

In this manner, FIG. 9 illustrates a method 900 where a portion of a needle point path can be disposed in a graphics region so that region can then be manipulated using graphical editing techniques, thereby editing the portion of the needle point path. Updated needle points can then be identified from the edited portion using graphic interpolation and these needle points can be used to generate the new needle point path.

Figure 11:
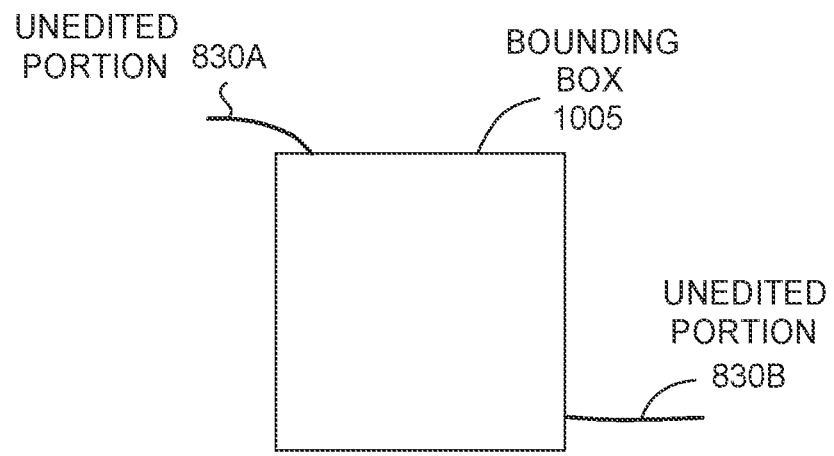
FIG. 11 illustrates deleting a selected portion of a needle point path, according to one embodiment.

FIG. 11 illustrates deleting a selected portion of a needle point path, according to one embodiment. FIG. 11 assumes that the user has already selected a portion of the needle point path and the embroidery application has created the bounding box 1005 around the selected portion. Further, as discussed in method 900, the bounding box 1005 may be used to create a graphics region.

The operating system (or other software on the user device) can then delete the selected portion (e.g., the selected portion 820 in FIG. 10A) in the bounding box 1005. Thus, the needle point path now includes only the unedited portions 830A and 830B.

Figure 12A:
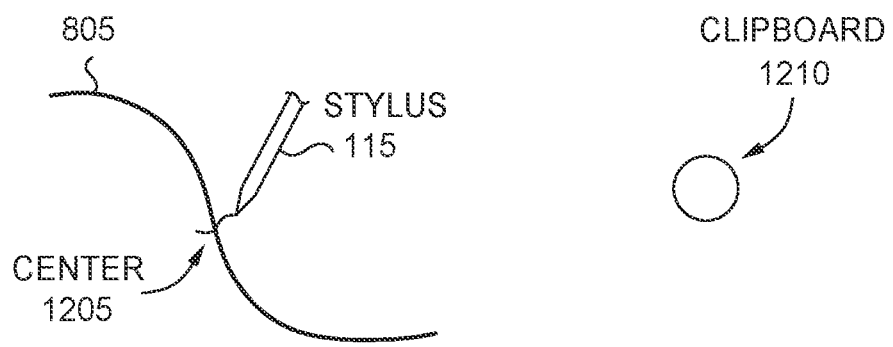
FIGS. 12A and 12B illustrate adding a selected portion to a needle point path, according to one embodiment.
Figure 12B:
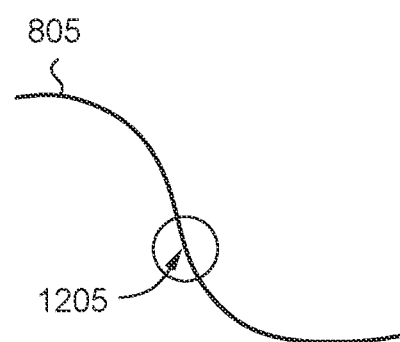

FIGS. 12A and 12B illustrate adding a selected portion to a needle point path, according to one embodiment. In FIG. 12A, the user can use the stylus 115 to indicate a center 1205, which indicates a location to put a needle point path in a clipboard 1210. In this example, the user can use the stylus to make a slash on the needle point path 805 which indicates the center 1205 where to place the needle point path saved in the clipboard 1210.

The needle point path in the clipboard 1210 may not be currently displayed on the device during FIG. 12A. For example, the user may be able to select various different needle point paths that are stored in the clipboard 1210. Once selected, the user can then make the slash on the needle point path 805. The intersection of the slash with the needle point path 805 indicates the center 1205 of where the needle point path in the clipboard 1210 should be placed.

In one embodiment, the needle point path in the clipboard 1210 may be a selected portion of another needle point path. The user may have used a "cut" editing task to remove this selected portion from that needle point path and store it in the clipboard 1210. The user can then use a "paste" editing task to then paste the selected portion from the clipboard 1210 onto the needle point path 805.

In one embodiment, the clipboard 1210 can include a catalog of different needle point paths. For example, the clipboard 1210 may include the most common used shapes in embroidery designs (e.g., circles, ovals, lines, squares, etc.). The user can then use the embodiments herein to add these needle points paths to an existing needle point path 805.

FIG. 12B illustrates the result of adding (or pasting) the needle point path in the clipboard 1210 onto the needle point path 805. Using the embodiments discussed above, the added needle point path can be combined with the needle point path 805 to generate a single needle point path.

Figure 13A:
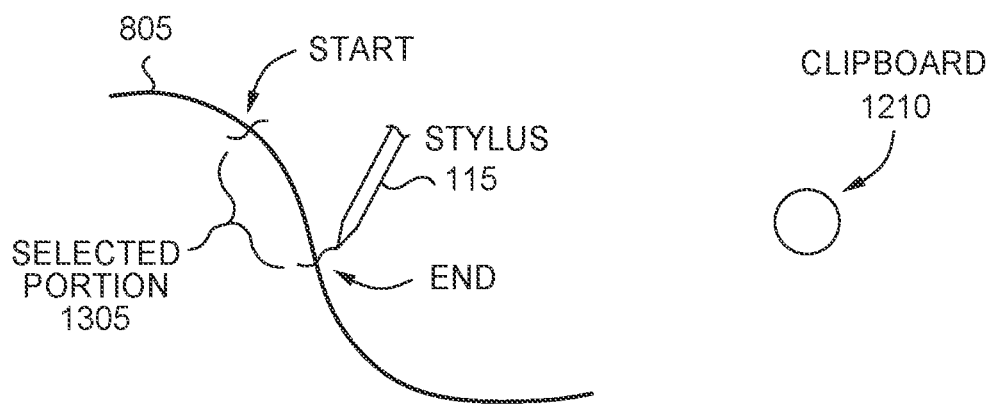
FIGS. 13A and 13B illustrate replacing a selected portion of a needle point path, according to one embodiment.
Figure 13B:
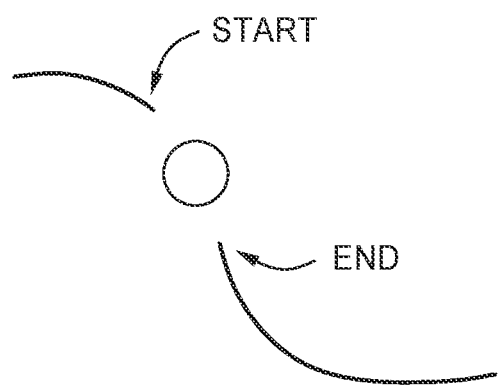

FIGS. 13A and 13B illustrate replacing a selected portion of a needle point path, according to one embodiment. FIG. 13A illustrates the user using the stylus 115 to indicate a start and an end of a selected portion 1305 of the needle point path 805. For example, the user can use the technique described in FIG. 8B to identify the selected portion 1305. However, the user can use any technique, such as the technique described in FIG. 8C, to identify the selected portion 1305.

The method 900 can then be used to identify a bounding box (not shown) and create the graphics region. In one embodiment, the user can then select a "replace" editing task to remove the selected portion 1305 and replace it with a needle point path from the clipboard 1210. For example, the user device may display a list of editing features (e.g., copy, delete, rotate, resize, replace, paste, etc.) that the user can select to perform various editing tasks.

FIG. 13B illustrates removing the selected portion 1305 from the path 805 and replacing it with the needle point from the clipboard 1210. In one embodiment, the process in FIGS. 13A and 13B can be expressed as a delete followed by an addition (or paste) of the needle point path in the clipboard 1210.

In one embodiment, the operating system adds the path in the clipboard 1210 at the center of the selected portion 1305 (e.g., a center of the bounding box encapsulating the portion 1305). In another embodiment, the operating system can prompt the user to indicate where to place the needle point path in the clipboard 1210 which can occur before or after the selected portion 1305 has been removed.

Figure 14:
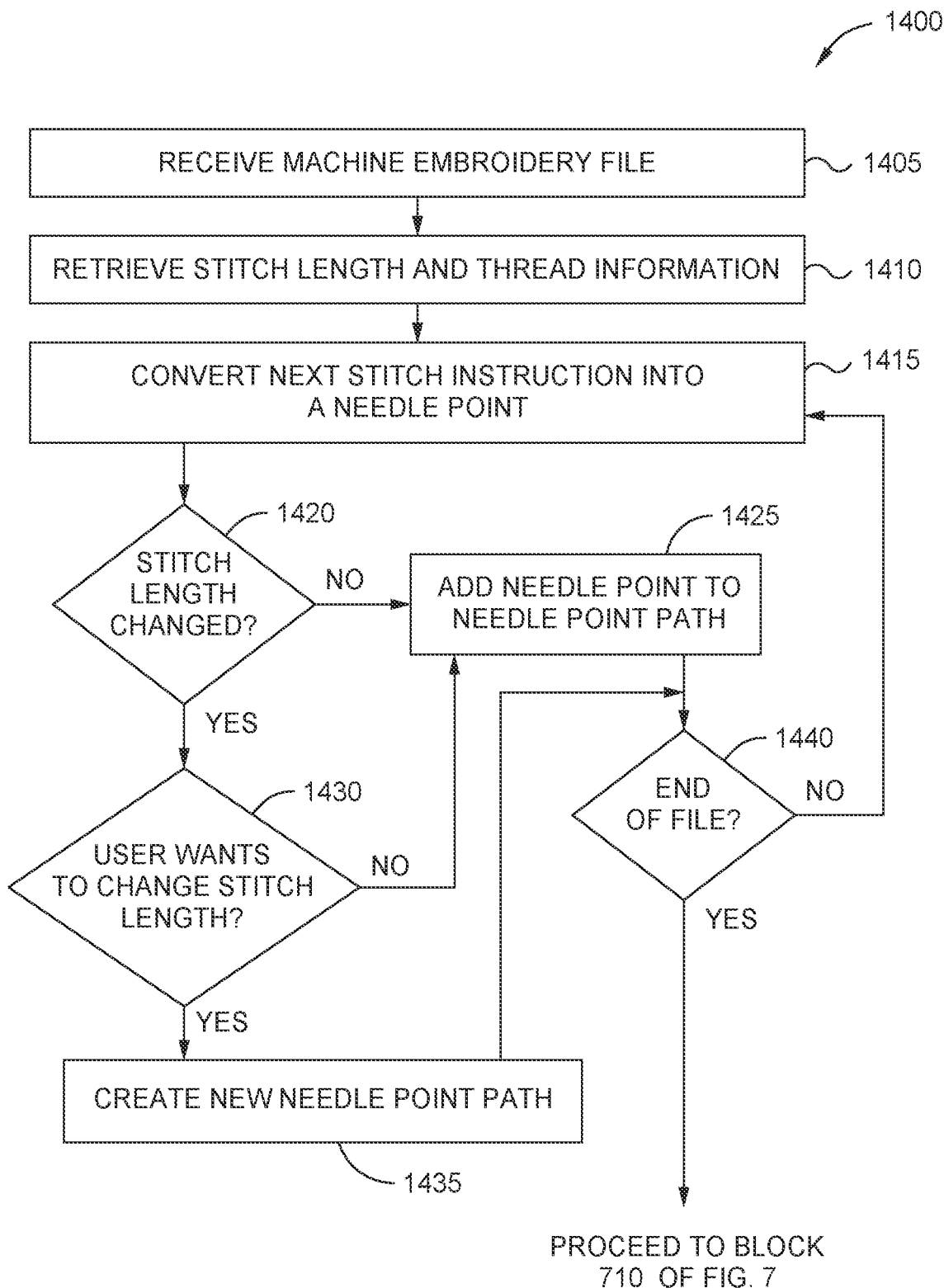
FIG. 14 is a flowchart for converting a machine embroidery file into a needle point path, according to one embodiment.

FIG. 14 is a flowchart of a method 1400 for converting a machine embroidery file into a needle point path, according to one embodiment. As mentioned above at block 705 of the method 700, an machine embroidery file may be used to identify a needle point path. However, this file includes instructions for an embroidery machine, and thus, is not in the same format or have the same data structures as a needle point path. The method 1400 can be used to convert the data in a machine embroidery file into a needle point path.

At block 1405, the embroidery application receives a machine embroidery file which may have been selected or loaded by the user.

At block 1410, the embroidery application retrieves stitch length and thread information. In some embodiments, the stitch length and the thread information (e.g., type of thread)

is provided in the embroidery machine file. If not, the embroidery application can use two of the stitch instructions in the file to determine the stitch length. That is, the embroidery application can plot the coordinates of the two stitches in an 2D plane and then use geometry to calculate the distance between the stitches, thereby indicating the stitch length. If the thread information is not in the file, the embroidery application can query the user.

At block 1415, the embroidery application converts the next stitch instruction in the file into a needle point. In one embodiment, the embroidery application translates the location or coordinates of the stitch instruction into a location for the needle point that will be displayed on the user device.

At block 1420, when parsing the stitch instructions in the file, the embroidery application determines whether the stitch length has changed. That is, some machine embroidery files can support changes in stitch length (as well as thread changes). As an example, the file may indicate that the first half of the stitches should be made using a first stitch length, but then a second stitch length is used for the remaining stitches because, e.g., a different thread is used. Thus, the embroidery application can identify the distance from the location of the current stitch instruction to the location of the previous stitch instruction to determine whether the stitch length has changed.

If the stitch length remains the same, then at block 1425 the embroidery application adds the needle point to the needle point path. In this manner, the embroidery application converts each of the stitch instructions into a needle point which is then combined with previously identified needle points to form a needle point path.

At block 1440, the embroidery application determines whether it has parsed the entire machine embroidery file, and if not returns to block 1415 to fetch another stitch instruction.

If at block 1420 the application determines that the stitch length has changed, then the method 1400 proceeds to block 1430 where the embroidery application queries the user to determine if they want the stitch length to change. If the user says no, the method 1400 proceeds to block 1425 where the current needle path is added to the current needle point path, but using the current stitch length. This may require the embroidery application to modify the location of the needle point so it satisfies the current stitch length (e.g., moving the needle point further away from, or closer to, the previous needle point).

However, if the user wants to change the stitch length, the method 1400 proceeds to block 1435 where the embroidery application creates a new needle point path that uses the new stitch length. In one embodiment, each time the stitch length changes in the machine embroidery file (and with the user's permission), the embroidery application generates a new needle point path. The method 1400 can then proceed to block 1425 where the current needle point is added to the new needle point path.

Once the method 1400 has reached the end of the machine embroidery file, the method proceeds to block 710 of FIG. 7 where the user can then edit the needle point path (or paths) using the techniques discussed above.

Creating Parent Composite Actions

Figure 15:
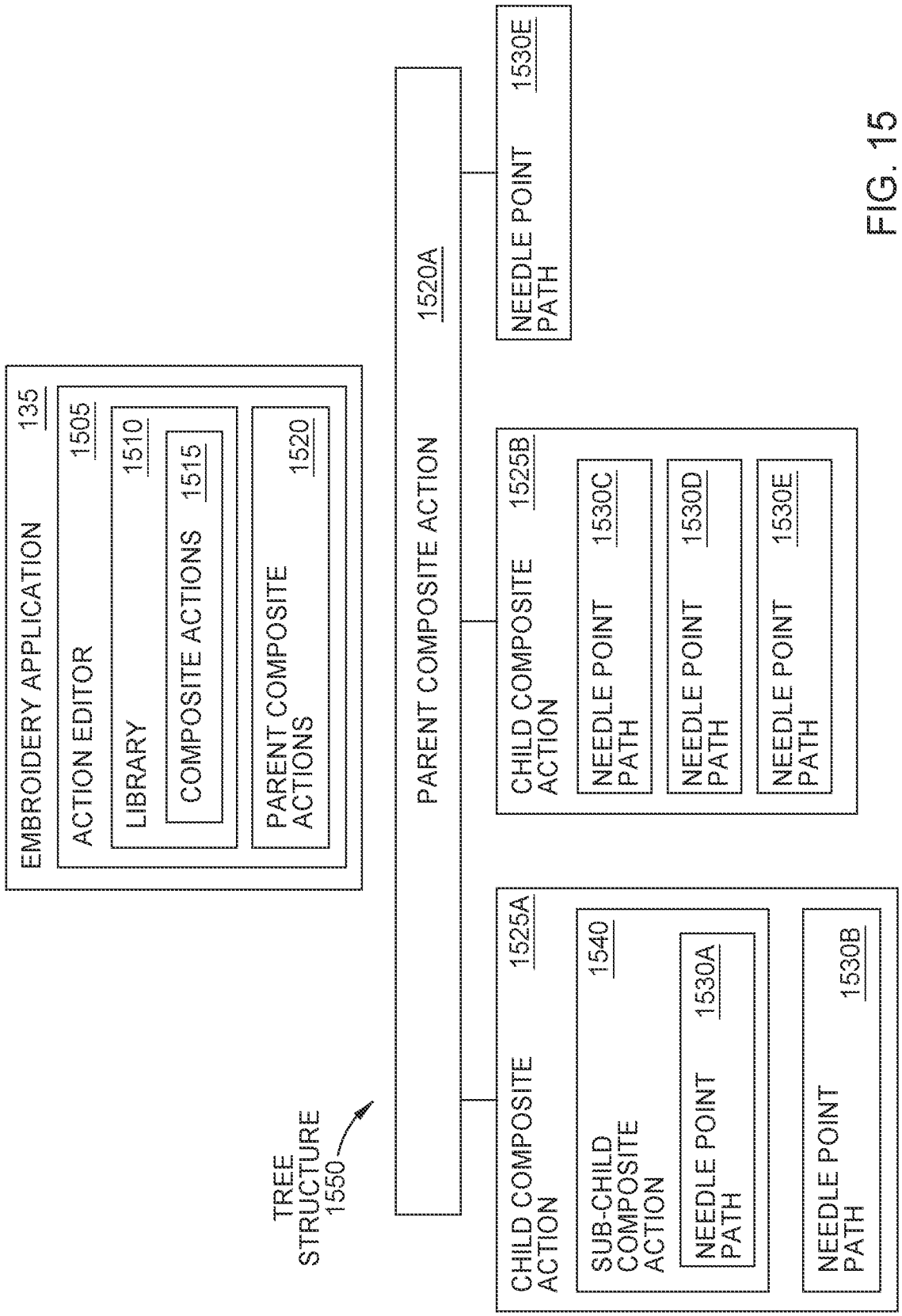
FIG. 15 is a block diagram of an embroidery application that supports parent composite actions, according to one embodiment.

FIG. 15 is a block diagram of the embroidery application 135 which supports parent composite actions 1520, according to one embodiment. In this example, the embroidery application 135 includes an action editor 1505 (e.g., a software application or software module) that creates the parent composite actions 1520 using user input. The action editor 1505 also includes a library 1510 (or some other data store) which stores composite actions 1515. In one embodiment, the composite actions 1515 are previously created composite actions that include one or more needle point paths. For example, the library 1510 may store composite actions that define different shapes or images (e.g., a first composite action that includes needle point path(s) defining an eye, a second composite action that includes needle point path(s) defining a nose, a third composite action that includes needle point path(s) defining a rabbit, a fourth composite action that includes needle point path(s) defining a car, and so forth).

The composite actions 1515 can in turn be formed using a combination of composite actions. For example, a composite action 1515 for a farm may include multiple composite actions defining a house, animals, a garden, tractor, barn, etc. Thus, the composite actions 1515 can be mix of other composite actions that can be selected by the user.

In the embodiments described below, the action editor 1505 permits a user to generate a parent composite action 1520 using the composite actions 1515 stored in the library 1510. For example, the user may wish to create an embroidery design of a farm scene during sunset. The user can create a parent composite action 1520 that is a combination of a farm composite action 1515 and a sunset composite action 1515 stored in the library 1510.

In addition to using the composite actions 1515 stored in the library 1510, the user can also add hand drawn needle point paths to the parent composite action 1520. For example, if the library 1510 did not include a sunset composite action, the user can instead draw a setting sun in the farm composite action 1515. The action editor 1505 can support any of the embodiments described above where an input element (e.g., a stylus) can be used to draw and edit needle point paths on a touch screen.

FIG. 15 also illustrates a data structure of a parent composite action 1520A. In this example, the data structure for the action 1520A is a tree structure 1550 where the parent composite action 1520A serves a root node and can have any number of child objects (also referred to herein as "children" or "child nodes"). There are two types of child objects in FIG. 15: child composite actions 1525 and needle point paths 1530. In one embodiment, the child composite actions 1525 are the composite actions 1515 stored in the library 1510 that the user has added to the parent composite action 1520. The child composite actions 1525 include at least one needle point path, but can also include one or more sub-child composite actions 1540.

In one embodiment, the child composite actions 1525 are branches of the tree while the needle point paths 1530 are leafs or terminals of the tree. The design of the parent composite action 1520 is defined by the needle point paths 1530 that were either hand drawn by the user, such as the needle point path 1530F, or the needle point paths 1530 within the child (and sub-child) composite actions 1525.

In this example, the parent composite action 1520A has three child objects: the child composite action 1525A, the child composite action 1525B, and the needle point path 1530F. The child composite action 1525A includes a sub-child composite action 1540 and the needle point path 1530B. The sub-child composite action 1540 includes its own needle point path 1530A.

The child composite action 1525B includes three needle point paths 1530C-E. Thus, unlike the child composite action 1525A, the child composite action 1525B does not include a sub-child.

As already mentioned, the needle point path 1530F can be a hand drawn needle point path. For example, after adding the child composite actions 1525A-B, the user may want to add an additional feature to the parent action, such as a line connecting the needle point path 1530B in the child action 1525A to the needle point path 1530C in the child action 1525B. The user can use an input element as described above to draw the needle point path 1530F that connects the child action 1525A to the child action 1525B.

FIG. 15 illustrates just one example of a parent composite action 1520. In other examples, the parent composite action 1520 may include only hand drawn needle point paths, or only include composite actions 1515 retrieved from the library 1510 or from some other source (e.g., from an Internet site, purchased from an electronic retailer, from a friend, etc.). Further, the parent composite action 1520 can include any number of child objects or nodes. If the child object is a child composite action 1525, it can have any number of sub-child composite actions 1540 which can in turn have their own sub-child composite actions.

Figure 16:
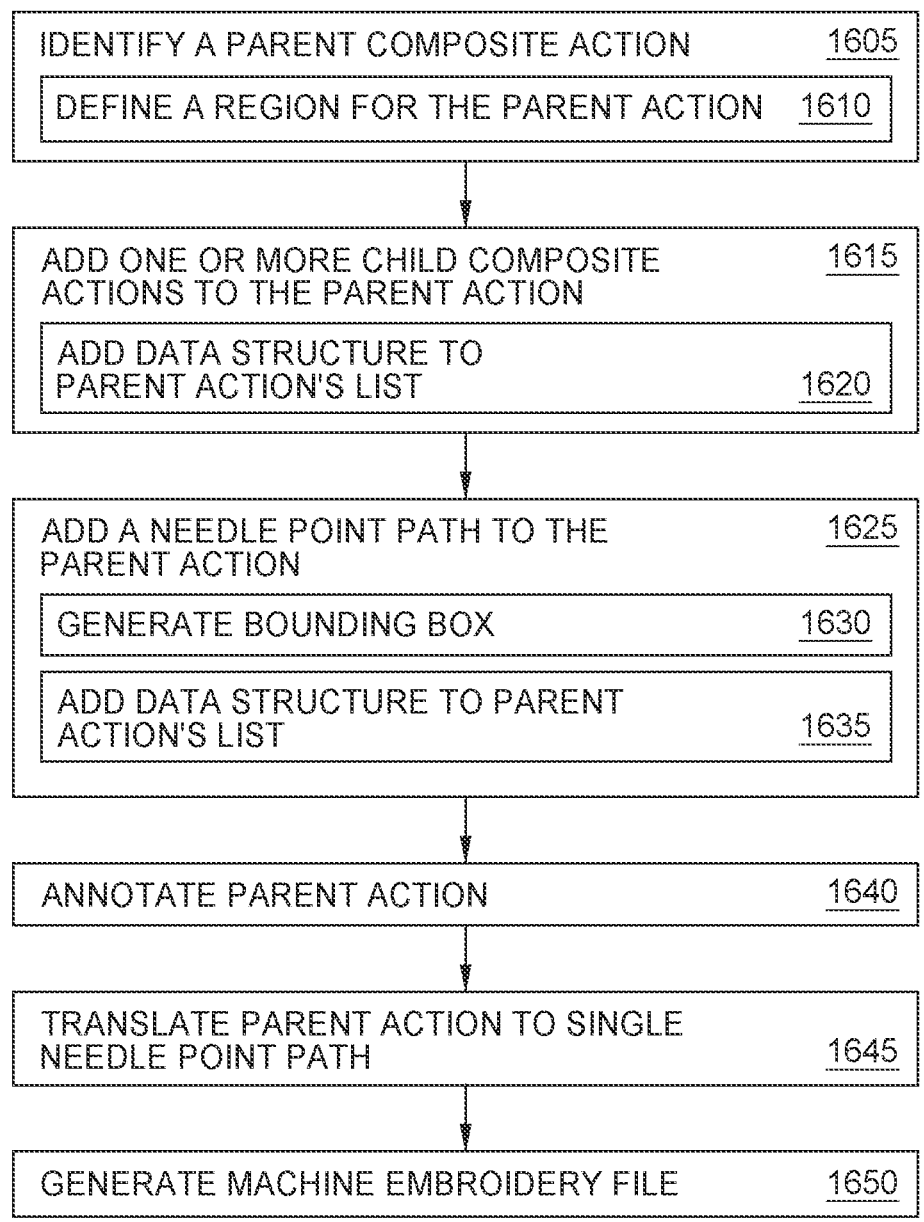
FIG. 16 is a flowchart for adding children to a parent composite action, according to one embodiment.

FIG. 16 is a flowchart of a method 1600 for adding children to a parent composite action, according to one embodiment. At block 1605, the action editor identifies a parent composite action. In one embodiment, a user selects a previously created parent composite action to edit. For example, the user may want to add to, modify, or delete portions of a previously saved parent composite action. In another embodiment, the user creates a new parent composite action.

At block 1610, the action editor defines a region for the parent composite action. This region can be outlined using a bounding box or some other shape. The region can be set by the user or can be determined by the action editor so that the bounding box encapsulates all the child objects in the parent composite action. For example, when generating a new parent composite action, the user may define the size of the region, or the action editor may display a default sized bounding box which the user can then expand or enlarge.

At block 1615, the action editor, in response to user input, adds one or more child composite actions to the parent composite action. In one embodiment, the user may select a composite action in a library (e.g., the library 1510 in FIG. 15) to add to the parent composite action. However, in other examples, the user may receive the composite action from an external source, such as an electronic retailer or an Internet site.

As part of adding the child composite action to the parent action, at block 1620, the action editor adds a data structure corresponding to the child composite action to a parent action's list. This list may include the data structure for all the child objects in the parent composite action. The data structure for the child composite action can define the needle point paths in the action, thread information, any sub-child composite actions in the child composite action, a name of the child composite action, and a bounding box for the child. In one embodiment, the list for the parent composite action can have a tree type data structure as shown in FIG. 15.

At block 1625, the action editor, in response to user input, adds a needle point path to the parent composite action. Adding the needle point path to the parent composite action makes the needle point path a child object in the parent action. In one embodiment, the needle point path is hand drawn by the user using an input element and a touch screen. For example, a GUI can display a button that when selected by the user, enables the user to use a stylus to draw a needle point path within the region of the parent action, thereby adding the needle point path to the parent action.

In another embodiment, the user may draw the needle point path on another part of the touch screen and then drag the needle point path into the region of the parent composite action, thereby adding it to the parent action as a new child object.

As part of adding the needle point path to the parent composite action, at block 1635, the action editor generates a bounding box for the needle point path. Examples of this are discussed and shown in FIGS. 10A and 11 above. However, instead of encapsulating a portion of the needle point path as in those examples, the bounding box may encapsulate the entire needle point path drawn by the user. This bounding box may be drawn by the user or generated automatically by the embroidery application. For example, the embroidery application may determine a bounding box that encapsulates all the X/Y coordinates of the needle points in the needle point path.

At block 1635, the action editor adds a data structure corresponding to the needle point path to the parent action's list. The data structure can include a name of the path, stitch length, thread information, a list of needle points (X/Y coordinates) making up the path, a bounding box for the path, and any annotations describing the needle point path (e.g., a square, arc, ball, car, rabbit, etc.).

Notably, the data structures for the child composite actions can also include some or all of the same information for their needle point paths that is stored for the hand drawn needle point paths. That is, for each needle point path in a child composite action, the data structure may store stitch length, thread information, a list of needle points (X/Y coordinates) making up the paths, a bounding box for the path, and any annotations describing the needle point paths.

At block 1640, the user annotates the parent action. The annotation can describe the embroidery design formed by the needle point paths in the parent action (e.g., a rabbit, human face, home, sunset, etc.). The annotation may provide a category of the embroidery design in the parent action. For example, the embroidery design is a human face, then the category may be "human features" or "human body." If the embroidery design is a rabbit, the category may be "animal" or "mammal." The annotation could also include the type of embroidery, or if the embroidery is for a specific fabric or material.

In one embodiment, the text in the annotation can be used to search a plurality of parent actions. For example, after creating the parent composite action, it may be stored in the library (e.g., the library 1510 in FIG. 15). Later, the user can search the library 1510 using the annotations to identify relevant embroidery designs (e.g., furry animals or human features). Thus, the parent composite action can be saved and then later retrieved from the library and used as a child composite action for a new parent composite action.

At block 1645, the action editor translates the parent action into a single needle point path. To do so, the action editor may traverse the list of child objects in the parent composite action (which can have a tree structure) to identify the needle point paths in the child objects. That is, action editor can traverse or search each child object to identify the terminals or leaf nodes, which can be the hand drawn needle point paths as well as the needle point paths in the child (and sub-child) composite actions. This is discussed in more detail in FIG. 22.

Once collected, the action editor can use jump stitches to connect the identified needle point paths into a single needle point path.

At block 1650, the action editor generates a machine embroidery file using the single needle point path. The action editor generates an embroidery machine file using the needle points and the jump stitches identified at block 1645 that are part of the needle point path. The embroidery machine file can list a series of instructions that, when executed on an embroidery machine, cause the machine to make stitches in a material (e.g., fabric) at the needle points. Further, the embroidery machine file can have stop instructions corresponding to the jump stitches so a technician can cut the thread so the embroidery machine can resume forming the design at a different location. However, while current machines cannot stop the embroidery design in one location and resume the design in another location without human assistance, further embroidery machines may have this function. In that case, the embodiments herein can still be used to generate the embroidery machine file but instead of using the jump stitches to form stop instructions, the jump stitches can be used to instruct the machine to automatically stop the embroidery design in one location and resume the design in another location.

In one embodiment, as part of generating the embroidery machine file, the embroidery application can first perform the optimization techniques discussed above in FIG. 5 before generating the file. However, these optimization techniques are optional.

Figure 17:
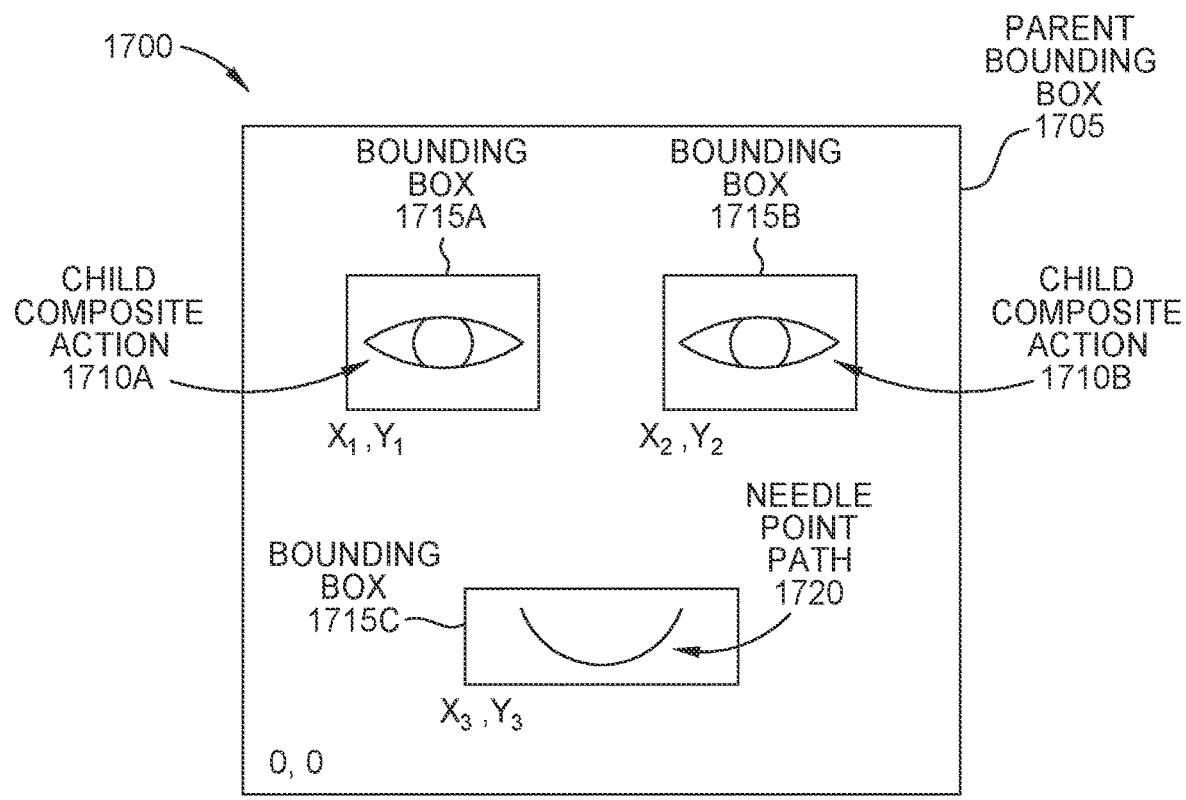
FIG. 17 illustrates a parent composite action, according to one embodiment.

FIG. 17 illustrates a parent composite action 1700, according to one embodiment. That is, FIG. 17 illustrates a graphical view of a parent composite action 1520 when being displayed on the user device. Thus, while FIG. 15 illustrates a view of a tree structure used to organize the data in a parent composite action, FIG. 17 illustrates how the tree structure can be used to display a visual representation of the parent composite action on a user device.

The parent action 1700 includes a parent bounding box 1705 which defines a region of the parent composite action 1700 as discussed at block 1610 of the method 1600. The bounding box 1705 sets a reference point for the other bounding boxes for the child objects in the parent composite action. In this example, the bottom left corner of the bounding box 1705 is set as the reference point (0, 0).

The parent action 1700 includes two child composite actions 1710A and 1710B which are duplicates of each other. The child composite actions 1710A and 1710B include respective bounding boxes 1715A and 1715B. The child composite actions 1710A and 1710B include one or more needle point paths that represent an eye. For example, when generating the parent composite action 1700, the user may select the same composite action stored in the library (e.g., a "human eye" embroidery design) two times and drag the bounding boxes 1715A and 1715B for these actions 1710 into the locations within the bounding box 1705. As discussed at blocks 1615 and 1620 above, doing so adds the composite actions 1710A and 1710B as child objects in the parent composite action 1700. That is, the data structures of the child composite actions 1710A and 1710B are added to the parent composite action's list.

To form the mouth of the face, instead of using a stored composite action, the user instead hand draws the needle point path 1720. The user may have drawn the needle point path 1720 in the location shown in FIG. 17, or could have drawn the needle point path 1720 in a different location of the touch screen and then dragged the bounding box 1715C of the needle point path 1720 to its current location.

To properly display the child objects in the parent action 1700 (i.e., the child composite actions 1710 and the needle point path 1720), the action editor can track the locations of the bounding boxes 1715A-C relative to the reference point of the parent bounding box 1705. That is, the action editor can store in the parent action's list the current X/Y coordinate of the bounding boxes 1715A-C for the child object relative to the reference point of the parent bounding box 1705. That way, if the user saves, closes, and then later reopens the parent composite action 1700, the bounding boxes 1715A-C can be displayed in the same locations relative to the parent bounding box 1705. Further, if the user moves the parent bounding box 1705 to a different location, the user device can automatically move the bounding boxes 1715A-C for the child objects so they remain in the same relative locations within the parent bounding box 1705.

Figure 18:
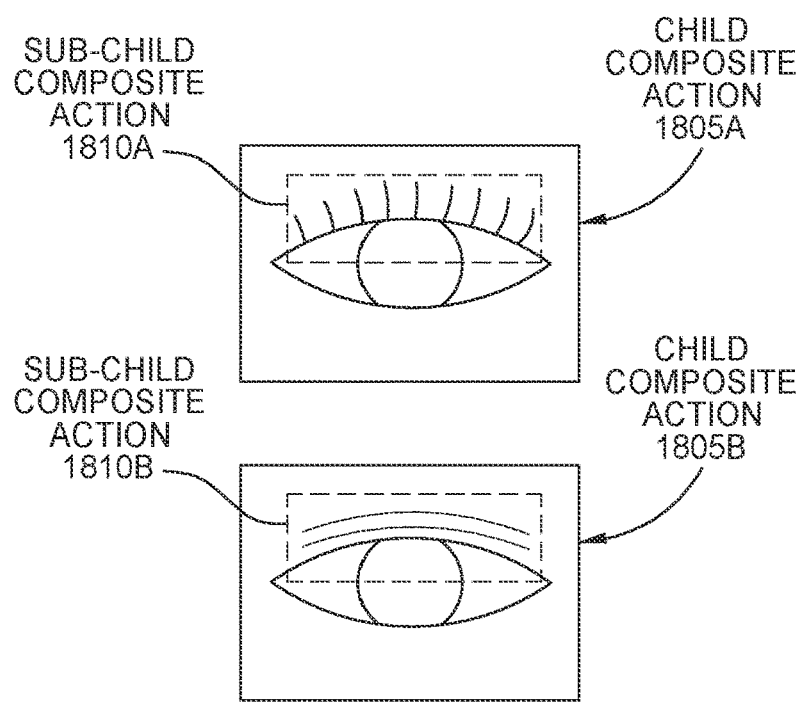
FIG. 18 illustrates child composite actions with sub-child composite actions, according to one embodiment.

FIG. 18 illustrates child composite actions with sub-child composite actions, according to one embodiment. For example, the child composite action 1805A illustrates an eye which includes a sub-child composite action 1810A forming eyelashes. For example, the child composite action 1805A can have a corresponding data structure similar to the child composite action 1520A in FIG. 15 which includes a sub-child composite action 1540 along with a separate needle point path 1530B. That is, the data structure for the child composite action 1805A in FIG. 18 can include a needle point path (or paths) that defines the eye while the sub-child composite action 1810A includes a needle point path (or paths) that defines the eyelashes.

The child composite action 1805B is similar to the child composite action 1805A except that instead of having eyelashes, the action 1805B contains a sub-child composite action 1810B forming frown lines above the eye. That is, the data structure for the child composite action 1805B can include a needle point path (or paths) that defines the eye while the sub-child composite action 1810B includes a needle point path (or paths) that defines the frown lines.

Thus, FIG. 18 illustrates that different sub-child composite actions 1810 can be added the same composite action (e.g., the composite action for the eye). In this case, the sub-child composite action 1810A for eyelashes is added to form the child composite action 1805A while the sub-child composite action 1810B for frown lines is added to form the child composite action 1805B. But for having different sub-child composite actions, the data structures for the two child composite actions 1805A and 1805B are the same.

Figure 19:
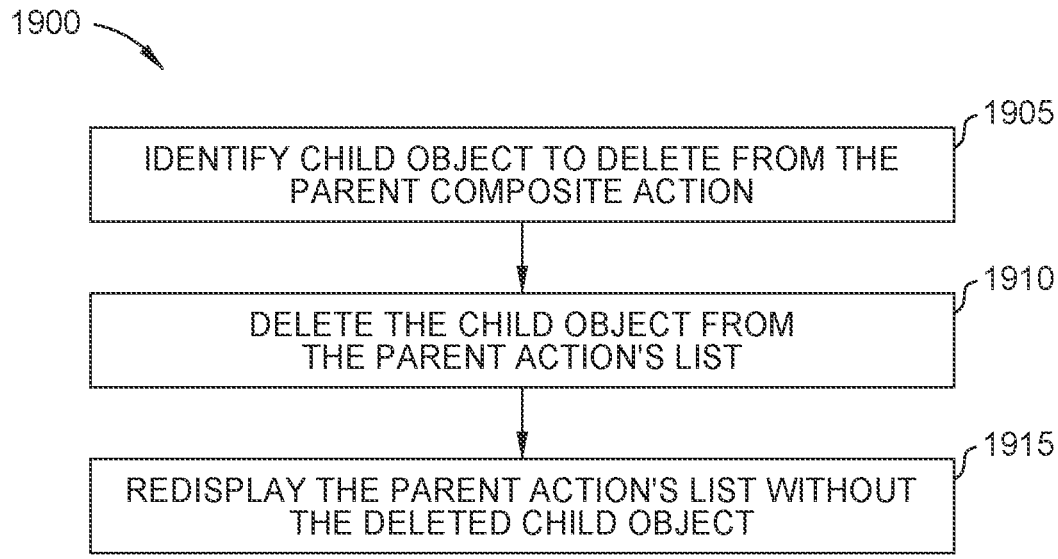
FIG. 19 is a flowchart for deleting a child from a parent composite action, according to one embodiment.

FIG. 19 is a flowchart of a method 1900 for deleting a child object from a parent composite action, according to one embodiment. At block 1905, the action editor, based on a user prompt, identifies a child object to delete from the parent composite action. The child object can be a child composite action or a needle point path (e.g., a hand drawn needle point path). Details for selecting a child object are discussed in FIG. 21.

Once identified, at block 1910 the action editor deletes the child object from the parent action's list. If the child object is a needle point path, then deleting the path includes removing the data structure of the needle point path from the parent action's list. If the child object is a child composite action, deleting this action removes its data structure which can include data structures for the needle point path(s) in the child composite action as well as the data structures for any sub-child composite actions in the child composite action.

At block 1915, the action editor redisplays the parent action's list without the deleted child object. That is, because the child object has been removed, the child object is no longer displayed as part of the parent composite action.

Figure 20:
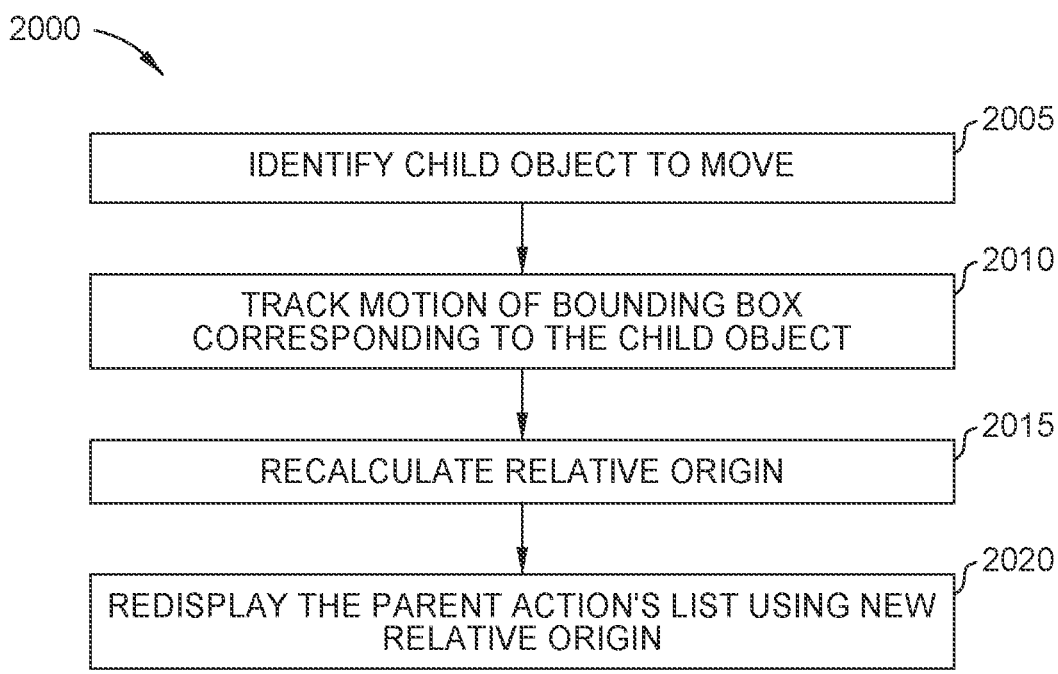
FIG. 20 is a flowchart for moving a child in a parent composite action, according to one embodiment.

FIG. 20 is a flowchart of a method 2000 for moving a child in a parent composite action, according to one embodiment. At block 2005, the action editor, based on a user prompt, identifies a child object to move within the parent composite action. Moving a child object may be performed in response to the user grabbing a child object (or a bounding box for the child object) using an input element and moving the child object to a different location in the parent composite action, or the method 2000 could be performed as part of a paste operation. Further a copy and paste operation could be performed as a combination of the delete operation discussed in method 1900 and the move operation discussed in method 2000.

At block 2010, the action editor tracks the motion of the bounding box corresponding to the child object. This can include the user dragging the bounding box to a different location, or the user performing a paste function that inserts the bounding box at a particular location within the region of the parent composite action.

At block 2015, assuming the user has moved the bounding box, the action editor recalculates the relative origin of the child object in the region of the parent composite action. In one embodiment, the action editor recalculates the position of the bounding box of the child object with the reference point of the bounding box for the parent composite action. Referring back to FIG. 17, if the user moves the bounding box 1715C for the needle point path 1720, the action editor can recalculate the $(x_3, y_3)$ coordinate $(x_3, y_3)$ of the bounding box 1715C relative to the reference point (0, 0) of the parent bounding box 1705.

At block 2020, the action editor redisplays the parent action's list using the new relative origin. For example, the data structure for the child object in the parent action's list can be updated with the new origin relative to the reference point of the parent's bounding box. This results in the child object being displayed in its new location within the region of the parent composite action.

Figure 21:
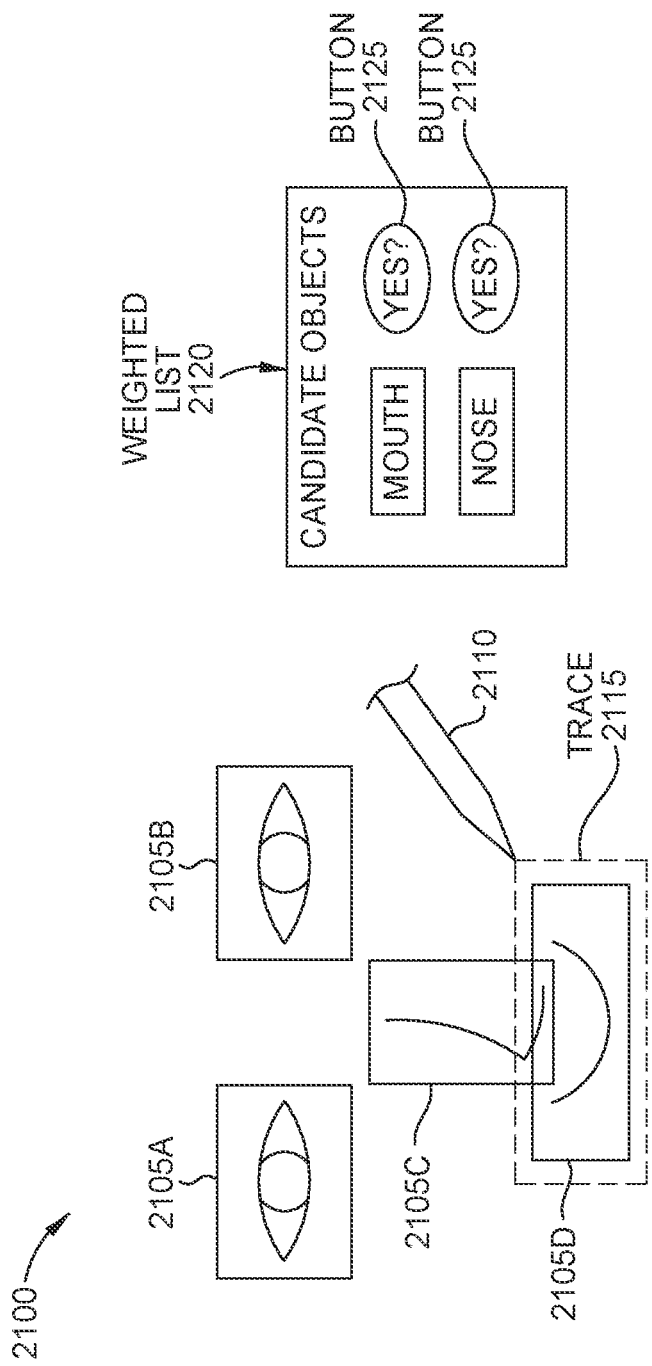
FIG. 21 illustrates selecting a child in a parent composite action, according to one embodiment.

FIG. 21 illustrates selecting a child object in a parent composite action, according to one embodiment. The techniques described in FIG. 21 can be used to identify a child object to move, cut, delete, or edit as discussed above. Further, the child objects in FIG. 21 can be either child composite actions or needle point paths.

Specifically, FIG. 21 illustrates a parent composite action 2100 that includes four child objects bound by separate bounding boxes 2105A-D. Notably, the bounding box 2105C for the nose child object partially overlaps the bounding box 2105D for the mouth child object. In this case, the user is attempting to select (or identify) the mouth child object. To do so, the user moves the stylus to form a trace 2115 that circles (or forms a lasso) around the mouth child object. However, because of the close proximity between the nose and mouth child objects, the trace 2115 includes the bounding boxes 2105C and 2105D for both the mouth and the nose.

If the trace 2115 included the bounding box for only one child object, then the action editor can automatically select that child object. However, in this case, the trace 2115 includes, at least partially, bounding boxes for multiple child objects. FIG. 21 illustrates the action editor displaying a weighted list 2120 of candidate objects. In this case, the list 2120 includes the name of the child objects that were at least partially include within the trace 2115 (i.e., the mouth and nose child objects). The weighted list 2120 also includes buttons 2125 that the user can touch to indicate which of the child object she intended to select.

The weighted list 2120 is weighted in the sense that the action editor orders the candidate child objects based on the amount of the bounding box that was included within the trace 2115. Because more of the bounding box 2105D for the mouth child object is encapsulated by the trace 2115 than the bounding box 2105C for the nose child object, the action editor displays the mouth child object higher in the weighted list 2120 (i.e., assigns a greater weight to the mouth child object). That is, the greater weight indicates it is more likely that the user intended to select the corresponding child object, which in this case is the mouth child object. Displaying this child object higher in the list 2120 may make it quicker for the user to select the desired child object since humans typically evaluate lists starting from the top and moving down. In this manner, the child objects can be given an assigned order in the list 2120 using the weights.

However, FIG. 21 is just one example of selecting child objects in a parent composite action. In other embodiments, the user may touch or press the bounding box of an object to select it (assuming the bounding boxes are displayed and not hidden). Or the action editor may display a list of all the child objects in the parent composite action on a side of the GUI, along with corresponding buttons that the user can press to select a child object.

Figure 22:
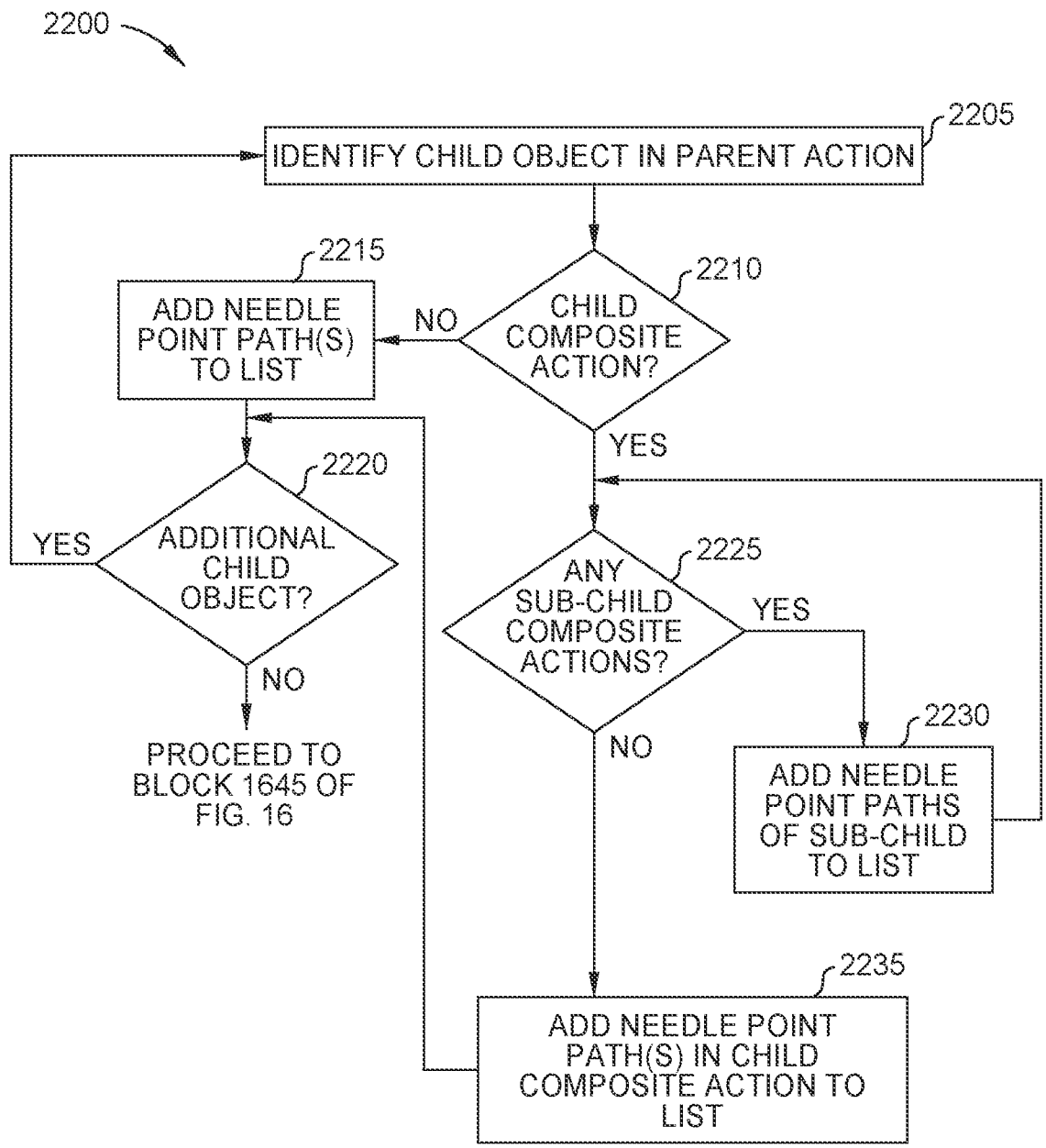
FIG. 22 illustrates identifying the needle point paths in a parent composite action, according to one embodiment.

FIG. 22 is a flowchart of a method 2200 for identifying the needle point paths in a parent composite action, according to one embodiment. In one embodiment, the techniques described in method 2200 can be used to traverse a tree data structure of a parent composite action. The method 2200 can be used to translate the parent composite action into a single needle path as described at block 1645 of the method 1600. In one embodiment, the method 2200 can be used to identify each of the needle point paths within the parent composite action.

At block 2205, the action editor identifies a child object in the parent composite action. As mentioned above, the child object can be a child composite action or a needle point path. In general, the method 2200 searches through the data structure of the parent composite action to identify the needle point paths (i.e., the terminals or leaf nodes of the tree data structure). If the child object is a needle point path, then the method 2200 can move on to the next child object. However, if the child object is a child composite action, the action editor identifies all the needle point paths within that action. Further, the child object can include one or more sub-child composite actions that in turn may have needle point paths.

If at block 2210 the action editor determines the child object is not a child composite action (i.e., the child object is a needle point path, such as a hand drawn path), the method 2200 proceeds to block 2215 where the needle point path is added to a list of needle point paths in the parent composite action. Stated differently, when reaching a needle point path, the action editor has reached a terminal or leaf node in the data structure.

At block 2220, the action editor determines whether there are any additional child objects for the parent composite action. If so, the method 2200 returns to block 2205 to evaluate the next child object, but if not, the method 2200 proceeds to block 1645 of FIG. 16 where the list of needle point paths are translated into a single needle point path for the parent composite action. This ends the method 2200.

However, returning to block 2210, if the child object is a child composite action, the method 2200 proceeds to block 2225 where the action editor determines whether the child composite action includes a sub-child composite action. If so, the method 2200 proceeds to block 2230 where the action editor adds the needle point paths in the sub-child to the list of needle point paths in the parent composite action.

Although not shown in FIG. 22, the sub-child composite action may itself include one or more sub-child composite actions. The action editor can then review those sub-child composite actions to identify their needle point paths and add them to the list of needle point paths in the parent composite action. This can continue until traversing all the different levels of sub-child composite actions for a child composite action.

The method 2200 can then return to block 2225 to determine whether there are any other sub-child composite actions in the child composite action. If so, the method 2200 can again proceed to block 2230 to add the needle point paths to the list (and determine if there are any more levels of sub-child composite actions).

If all the sub-child composite actions in a child composite action have been evaluated, the method 2200 proceeds to block 2235 where the needle point paths in the child composite action (if there are any) are added to the list of needle point paths in the parent composite action. The method 2200 then proceeds to block 2220 to determine whether there are more child objects in the parent composite action that have not yet been evaluated. Once all the child objects have been traversed, the method 2200 can return to block 1645 of FIG. 16 to translate the needle point paths to a single needle point path.

Creating an Composite Action Catalog

FIG. 23 is a block diagram of the embroidery application 135 which includes a searchable catalog, according to one embodiment. In this example, the embroidery application 135 includes a catalog creator 2305 (e.g., a software application or software module) that creates a catalog 2310 of composite actions 2320 and needle point paths 2325. In one embodiment, the composite actions 2320 are previously created composite actions that include one or more needle point paths 2325. For example, the composite actions 2320 and the needle point paths 2325 can define different shapes or images that form an embroidery design (e.g., a first composite action that includes needle point path(s) defining an eye, a second composite action that includes needle point path(s) defining a nose, a third composite action that includes needle point path(s) defining a rabbit, a fourth composite action that includes needle point path(s) defining a car, and so forth).

The composite actions 2320 can in turn be formed using a combination of composite actions. For example, a composite action 2320 for a farm may include multiple composite actions defining a house, animals, a garden, tractor, barn, etc. Thus, the composite actions 2320 can be mix of other composite actions that can be selected by the user. In one embodiment, a data structure for a composite action 2320 can define the needle point paths in the action, thread information, any child composite actions linked to the composite action, a name of the composite action, a bounding box for the action, a design intent, an embroidery technique, and any annotations. The annotations could notes provided by the user such as "The intent is to create a flower with 8 petals", "Adapted a petal design for the ears of a rabbit", or "Modified the shape of a rabbit ear to a pig ear." The data structure for a needle point path 2325 can include a name of the path, stitch length, thread information/attributes, a starting position, a list of needle points (e.g., X/Y Cartesian coordinates) making up the path, a bounding box for the path, a design intent, and an embroidery technique.

The catalog creator 2305 can form a composite action network 2315 using the composite actions 2320 and needle point paths 2325. The bottom half of FIG. 23 illustrates one example of a composite action network 2315 formed using the composite actions 2320 (e.g., a list of composite actions stored in the catalog 2310) and the needle point paths (e.g., a list of needle point paths stored in the catalog 2310). As shown, the composite actions 2320 can be linked to other composite actions as well as to needle point paths 2325. In one embodiment, the composite actions 2320 are unique. That is, the catalog creator 2305 may not permit the same composite action 2320 to be stored twice in the catalog. For example, if there is already a composite action 2320 in the catalog 2310 named "rabbit" and a user attempts to add another composite action 2320 to the catalog with the same name, then the catalog creator 2305 will refuse to add the action. Instead, the user may have to provide a different name to the composite action such as "side view of a rabbit." In general, any technique can be used to identify the composite actions 2320 such as names, numbers, hashes, etc.

In one embodiment, a composite action 2320 is linked to at least one needle point path 2325 or at least one composite action, which forms a parent-child relationship in the network 2315. That is, the composite action 2320 can include only needle point paths 2325, only other composite actions 2320 (i.e., child composite actions), or a combination of both. In this example, the composite action 2320A is linked to two needle point paths 2325A and 2325B and composite action 2320C. Composite action 2320B is also linked to composite action 2320C to form another parent-child relationship. For example, the composite action 2320C may be two arcs that are connected on their ends. Composite action 2320A may be an embroidery design of a flower where the two arcs in the composite action 2320C are used to form a petal of the flower. In contrast, composite action 2320B may be an embroidery design of a rabbit where the two arcs in the composite action 2320C are used to form an ear of the rabbit. Thus, the same composite action (i.e., composite action 2320C) may be linked or referenced by multiple other composite actions in the network 2315.

Further, the network 2315 may not be organized in an hierarchy since multiple objects (e.g., the composite actions 2320 and the needle point paths 2325) can reference other objects in the network 2315. For example, the needle point path 2325E is referenced by both the composite action 2320B (e.g., at the top of the network 2315) as well as the composite action 2320D (e.g., near the bottom of the network 2315). In generally, the composite actions 2320 can be branches in the network 2315 to can point to other composite actions 2320 and to the needle point paths 2325. In contrast, the needle point paths 2325 are terminals (or leafs) in the network 2315 since they can be referenced by a composite action 2320 but cannot point to any other objects in the network 2315.

While the network 2315 illustrates the needle point paths 2325 being separate from the composite actions 2320, this is not a requirement. For example, the composite action network 2315 could be organized where a needle point path 2325 is included within a composite action 2320, such that the needle point paths 2325 may not be referenced by multiple composite actions 2320. Further, the needle point paths 2325 may not be unique in the network 2315. In that case, the needle point paths 2325 would be inside a respective composite action 2320. For composite actions that use the same needle point path (e.g., such as the composite actions 2320B and 2320D that both reference needle point path 2325E), this needle point path can be stored in both composite actions. In this scenario, the composite action network 2315 would include links between the composite actions 2320, while each composite action 2320 may store needle point path(s), include links to other composite actions, or some combination of both.

Further, while the network 2315 includes composite actions 2320 that are linked to at least one other composite action, this is not a requirement. For example, the network 2315 may store composite actions that are not linked to any other composite actions. These composite actions would point to only needle point paths. In general, the composite actions 2320 can be formed using any of the techniques discussed above in FIGS. 15-18 for generating parent composite actions. For example, the composite actions A-D can be parent composite actions that were generated by the user which were then added to the catalog 2310.

In addition to including the composite action network 2315, the catalog 2310 can include a vocabulary 2330, design intent hierarchy 2335, and embroidery technique hierarchy 2340. The vocabulary 2330 establishes a word source for describing the embroidery designs corresponding to the composite actions 2320. In one embodiment, the vocabulary 2330 can be imported from another source such as a dictionary or from another search engine (e.g., an Internet search engine). In another embodiment, the user may provide some or all of the words for the vocabulary 2330. In one embodiment, when adding a new word, the catalog creator 2305 may query the user to see if the new word is a synonym of an existing word in the vocabulary 2330 (e.g., new word "feline" is a synonym of "cat" which is already in the vocabulary, or that "Easter" in the United States is called "Ostern" in Germany). The catalog creator 2305 can use back-pointer relationships to link synonyms in the vocabulary 2330. In one embodiment, the catalog creator 2305 indexes the vocabulary 2330 for efficient search using, for example, a hash or b-tree.

The design intent hierarchy 2335 can also be created by being imported from an external source, by receiving user input, or some combination of both. For example, the user may want to have one catalog for storing embroidery designs about animals, a second catalog for storing embroidery designs about plants, a third catalog for storing embroidery designs for outdoor scenes, and so forth. Or the user may want one catalog about the outdoors that is then subdivided into animals, plants, outdoor scenes, and the like. These design intents can then be subdivided further. For example, animals can be subdivided into mammals, reptiles, birds, etc. Thus, when a design intent is assigned to a composite action (which is discussed below), this associates the composite action with the design intent hierarchy 2335 so the composite action can be easily identified when performing a textual search of the catalog 2310.

When adding a new design intent, the catalog creator 2305 may query to user to determine how the new design intent fits into the hierarchy 2335. For example, the catalog creator 2305 may display the hierarchy 2335 using, e.g., nested lists, a tree, and the like. The user can then navigate the hierarchy 2335 until identifying where the new design intent should be added. For example, if the design intent hierarchy 2335 already includes the design intent "animals", when the user wants to add a particular animal (e.g., cow), it can select the "animal" design intent and instruct the catalog creator 2305 to add the new design intent to be below the "animal" design intent in the design intent hierarchy 2335. In one embodiment, the catalog creator 2305 indexes the design intent hierarchy 2335 for efficient search using, for example, a hash or b-tree.

Similar techniques can be used by the catalog creator 2305 to populate the embroidery technique hierarchy 2340. While there is currently a small number of machine embroidery techniques (less than fifty), establishing the hierarchy 2340 makes it easy to add new techniques, modify existing techniques, and combine existing techniques. For example, the embroidery technique hierarchy 2340 can indicate that the Blackwork and Cross stitch techniques are sub-techniques of Counted Thread embroidery. Furthermore, the user can modify an existing technique (e.g., Redworks) to make a sub-technique. In one embodiment, the catalog creator 2305 indexes the embroidery technique hierarchy 2340 for efficient search using, for example, a hash or b-tree.

The embroidery application 135 also includes a search engine 2345 which can perform a text-based search of the catalog 2310, an image-based search of the catalog 2310 using a needle point path, or both. The details for searching the catalog 2310 are discussed in FIGS. 27 and 28.

Figure 24:
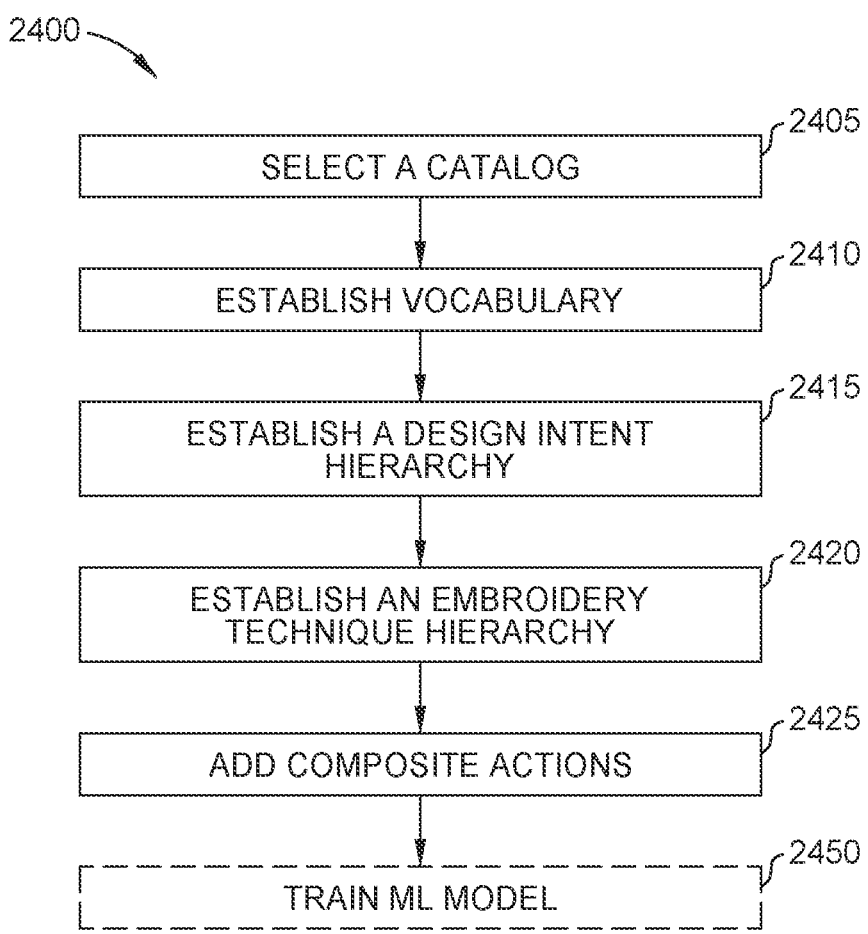
FIG. 24 is a flowchart for creating a catalog containing composite actions corresponding to embroidery designs, according to one embodiment.

FIG. 24 is a flowchart of a method 2400 for populating a catalog containing composite actions corresponding to embroidery designs, according to one embodiment. At block 2405, the user selects a catalog. In one embodiment, the user may load an existing catalog that is stored in memory on the user device (or in a cloud computing environment or database). For example, the user may have one catalog, or multiple different catalogs (e.g., a catalog of embroidery designs of animals, another with embroidery designs of buildings, another with embroidery designs of cars, and so forth).

In one embodiment, the user may select a template to create a new catalog. The template can include blank entries and empty data structures which can then be populated with composite actions, needle point paths, vocabulary, design intents, and embroidery techniques.

At block 2410, the catalog creator (e.g., the catalog creator 2305 in FIG. 23) establishes a vocabulary for the selected catalog (whether the catalog is an existing catalog that is being updated or a new catalog). The vocabulary is a source of words for describing the embroidery designs corresponding to the composite actions. That is, the vocabulary provides words from which the user can select when adding the composite actions (which is described later in the method 2400). In one embodiment, the vocabulary 2330 can be imported from another source such as a dictionary or a from another search engine (e.g., an Internet search engine).

In one embodiment, when adding a new word, the catalog creator may query the user to see if the new word is a synonym of an existing word in the vocabulary (e.g., "feline" is a synonym of "cat", or link words in different languages that have the same meaning or reference the same event). In another example, the catalog creator may use a digital thesaurus to identify synonyms for the words in the vocabulary, which does not rely on user input. The catalog creator can use back-pointer relationships to link synonyms in the vocabulary. In one embodiment, the catalog creator 2305 indexes the vocabulary for efficient search using, for example, a hash or b-tree.

At block 2415, the catalog creator establishes a design intent hierarchy for the catalog. The design intent hierarchy can also be created by being imported from an external source, by receiving user input, or some combination of both. For example, the a catalog for storing embroidery designs about animals (a first level in the hierarchy) could include a design intent hierarchy where mammals, reptiles, birds, etc. are below animals (a second level in the hierarchy). These design intents can then be further subdivided at a third level in the hierarchy. For example, mammals could be divided into small and large mammals, where rabbits, mice, and hamsters are below small mammals at a fourth level in the hierarchy and tigers, lions, walruses, and bears are below large mammals and also in the fourth level of the hierarchy. In this manner, a plurality of design intents can be linked together using different levels in the design intent hierarchy. Thus, when a design intent is assigned to a composite action (which is discussed below), this associates the composite action with the design intent hierarchy so it can be easily identified when performing a textual search of the catalog.

When adding a new design intent, the catalog creator may query to user to determine how the new design intent fits into the hierarchy. For example, the catalog creator may display the hierarchy using, e.g., nested lists, a tree, and the like. The user can then navigate the design intent hierarchy until identifying where the new design intent should be added. In one embodiment, the catalog creator indexes the design intent hierarch for efficient search using, for example, a hash or b-tree.

At block 2420, the catalog creator establishes an embroidery technique hierarchy. While there is currently a small number of machine embroidery techniques, establishing the embroidery technique hierarchy make it easy to add new techniques, modify existing techniques, and combine existing techniques. For example, the embroidery technique hierarchy can indicate that the Blackwork and Cross stitch techniques, which are in a lower level in the embroidery technique hierarchy, are sub-techniques of Counted Thread embroidery which is at a higher level in the hierarchy. Furthermore, the user can modify an existing technique (e.g., Redworks) at the first level to make a sub-technique (e.g., a customized Redworks embroidery technique) that is disposed a second level in the hierarchy. In this manner, a plurality of embroidery techniques can be linked together using different levels in the embroidery technique hierarchy. In one embodiment, the catalog creator indexes the embroidery technique hierarchy for efficient search using, for example, a hash or b-tree.

At block 2425, the catalog creator adds composite actions to the catalog. These composite actions can be used to create the composite action network 2315 discussed in FIG. 23. The details of adding composite actions are discussed in FIG. 25 below.

In addition to maintaining a list of composite actions in the catalog, the catalog creator can also maintain a list of needle point paths in the catalog. These needle point paths may be in (or linked to) a composite action, or may be independent of a particular composite action. That is, the list of needle point paths can include paths that are not linked to a composite action in the catalog.

At block 2450, the embroidery application trains a machine learning (ML) model for an artificial intelligence (AI) application using the catalog. The method 2400 can be used to develop a data set (i.e., a training data set) for automating the generation of new machine embroidery designs using current ML techniques. The relationship between the composite actions and the resulting needle point paths in those actions can be used to create fine-grained ML training sets. For example, the needle point paths can be used to render a digital image that can then be used as annotated data to train a ML model. That is, because the user can provide metadata regarding the needle point paths in the composite actions, such as their names, design intents, embroidery techniques, and so forth, this metadata can be used, along with the rendered digital images, to train the ML model to recognize name, design intents, and the embroidery techniques in unannotated images. Thus, the catalog generated at method 2400 can be used to train a ML model without requiring any human to curate the training data set. The trained ML model can then use the fine-grained relationship between an embroiderer's design intent and embroidery technique learned during training to facilitate search of the catalog.

However, the block 2450 is optional. That is, it is not necessary to train and then use a ML model in order to search the catalog. Examples of non-ML based techniques for searching the catalog are described in FIGS. 27 and 28.

Figure 25:
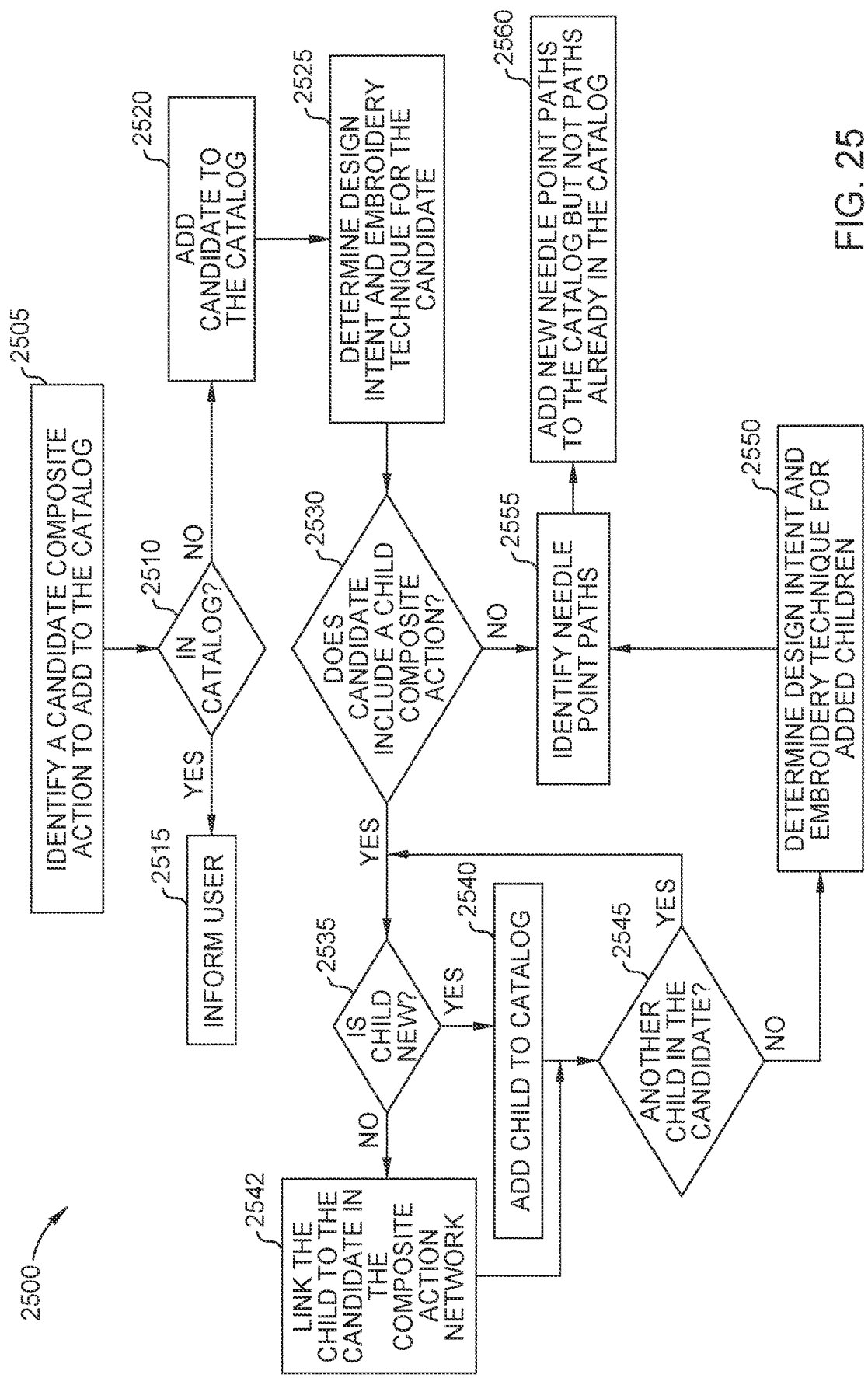
FIG. 25 is a flowchart for adding a composite action to the catalog, according to one embodiment.

FIG. 25 is a flowchart of a method 2500 for adding a composite action to the catalog, according to one embodiment. In one embodiment, the method 2500 describes techniques for adding a composite action (referred to as a candidate composite action) to a catalog as mentioned at block 2425 of FIG. 24.

At block 2505, the catalog creator identifies a candidate composite action to add to the catalog. In one embodiment, the candidate composite action is provided by a user. For example, the user may have generated a new parent composite action as described in FIG. 15 which the user now wishes to add to the catalog. In another embodiment, the catalog creator may perform an update to see if any new composite actions have been added to an online database, and if so, the catalog creator attempts to add those composite actions to a user's personal catalog.

At block 2510, the catalog creator determines whether the candidate composite action is currently in the catalog. In this embodiment, it is assumed that only one copy of a composite action is permitted in the catalog. Doing so can ensure that multiple composite actions are not linked to different saved versions of the same embroidery design. This makes it easier to delete and maintain the catalog. For example, if the catalog already has a composite action named "rabbit" and the candidate composite action has the same name, then it will be difficult for the user and the search engine to distinguish between the two candidate composite actions. Further, the user may inadvertently link a new composite action to the wrong "rabbit" composite action.

While the embodiments herein discuss composite actions being uniquely identified by an assigned name or design intent, in other embodiments, the composite actions may be identified using a unique number or other type of ID. For example, the catalog creator may permit the same named composite action to be in the catalog so long as they have different ID numbers.

If the candidate composite action has the same name or ID as a composite action already in the catalog, the method 2500 proceeds to block 2515 where the catalog creator informs the user. The user can then determine whether the composite actions are the same (for example, the user may not have realized the candidate composite action was already in her catalog). If they are not the same, the user may assign a different ID to the candidate composite action. For instance, instead of naming it a "rabbit" composite action, the user can change its name to "side view of a rabbit" and also change the name of the other composite action already in the catalog as "front view of a rabbit" so the composite actions can be uniquely identified using their names. The user can then ask the catalog creator to again attempt to add the candidate composite action to the catalog.

If at block 2510 the catalog creator determines the candidate composite action is not in the catalog, the method 2500 proceeds to block 2520 where the catalog creator adds the candidate composite action to the catalog. This adds the composite action to the list of the composite actions in the catalog.

At block 2525, the catalog creator determines the design intent and embroidery techniques for the candidate composite action. In one embodiment, the user can search through the design intent hierarchy and the embroidery technique hierarchy established in the method 2400 in FIG. 24 to select the applicable design intent and embroidery technique. If the design intent and embroidery technique for the candidate composite action are not in these hierarchies, the user can add them as described above.

Further, method 2500 assumes the name and the annotations of the composite action have already been assigned to the action, but if not, the catalog creator can also prompt the user for this information.

At block 2530, the catalog creator determines whether the candidate composite action has any child composite actions. If so, the method 2500 proceeds to block 2535 where the catalog creator selects one of the child composite actions and determines whether it is new to the catalog. That is, the catalog creator can perform the same analysis at block 2510 to determine whether the candidate composite action was already in the catalog.

If the child composite action is also not in the catalog, the method 2500 proceeds to block 2540 where the catalog creator adds the child composite action to the catalog. However, if the child composite action is already in the catalog, the method 2500 instead proceeds to block 2542 where the catalog creator links the child composite action to the candidate composite action in the composite action network. Using the composite action network 2315 in FIG. 23 as an example, assume that at Time 0 the network 2315 does not include the composite action 2320A (as well as the needle points 2325A and 2325B which are part of the composite action 2320A). At Time 1, the user instructs the catalog creator to add the composite action 2320A to the catalog 2310. Since this composite action is new, the catalog creator adds the composite action 2320A to the catalog. As discussed above, the catalog creator then determines whether its child composite actions are new. In this case, the network 2315 already includes the child composite action 2320C. For example, the composite action 2320C may define an embroidery design of a human mouth, while the new composite action 2320A defines an embroidery design of a human face.

Rather than creating and storing a new copy of the composite action 2320C, the catalog creator 2305 links the new composite action 2320A to the already existing composite action 2320C, thereby avoiding having two copies of the composite action 2320C in the catalog. At Time 2, after adding the composite action 2320A, the composite action 2320C is now linked by both composite action 2320A and composite action 2320B. For example, both composite actions 2320A and 2320B may be embroidery designs of different faces (e.g., a scared face and a surprised face) that both include the mouth embroidery design provided by the composite action 2320C.

At block 2545, the catalog creator determines whether there are any other child composite actions in the candidate composite action, and if so, the method 2500 returns to block 2535. Notably, a child candidate composite action can also have its own child composite action, which can have its own child composite action, and so forth. Although not shown in FIG. 25, the catalog creator can traverse multiple levels of children composite actions to determine whether they are or are not already in the catalog. If not, the composite actions are added.

After evaluating the child composite actions (and their children), the method 2500 proceeds to block 2550 where the catalog creator determines the design intent and embroidery technique for the added children composite actions. For example, the catalog creator can query the user to identify this information regarding the child composite actions, as well as any other annotations.

At block 2555, the catalog creator identifies the needle point paths for the candidate composite action (if any) and its children composite actions (if any). At block 2560, the catalog creator adds the needle point paths not already in the catalog into the list of needle point paths. Further, in one embodiment, the needle point paths may be linked to composite actions in the composite action network.

In another embodiment, the catalog may store duplicate copies of the same needle point path. For example, the same needle point path may be stored in different composite actions. As an example, a composite action for a rabbit ear may have the same needle point path (e.g., two connected arcs) as a composite action for a flower petal.

Figure 26:
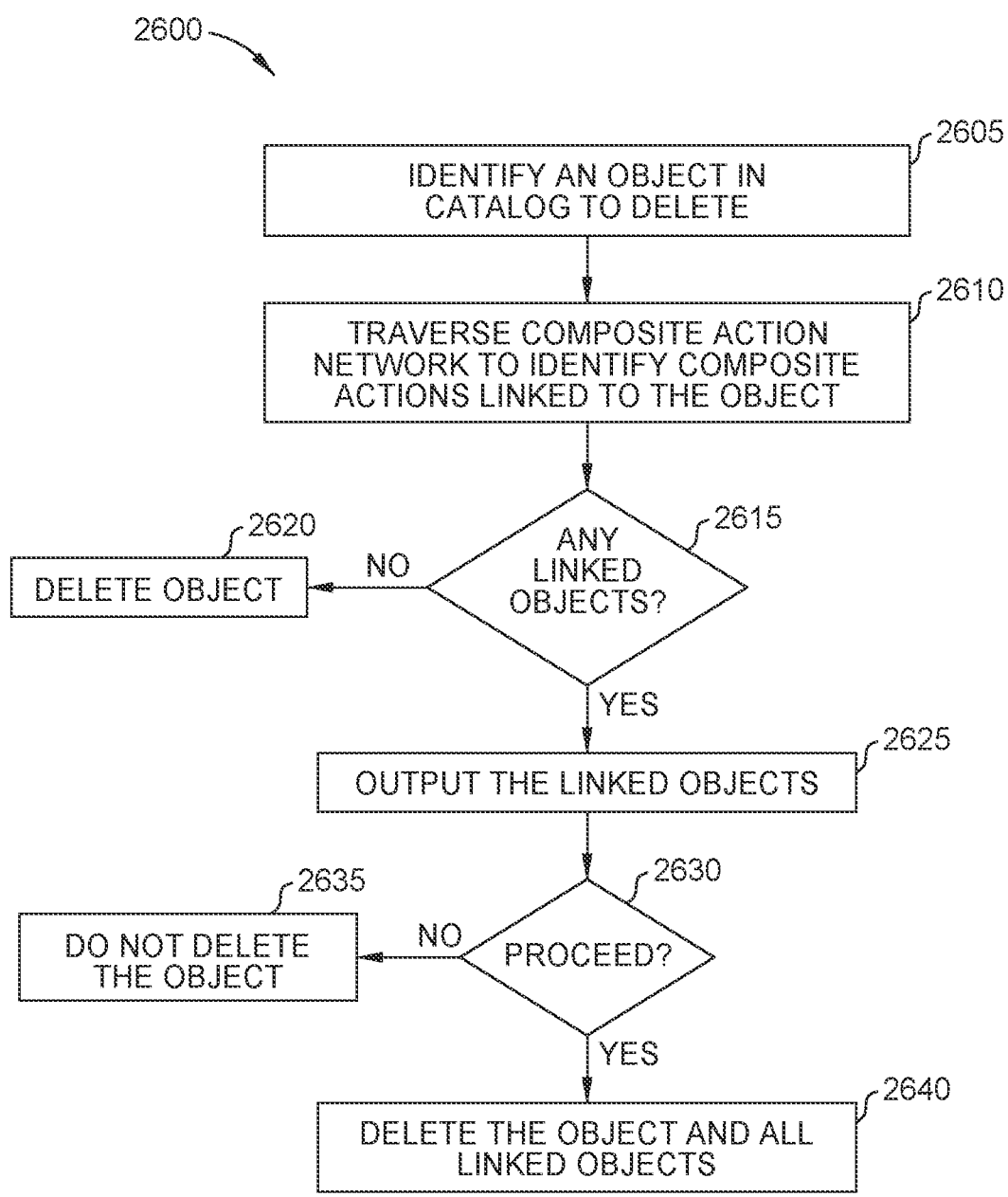
FIG. 26 is a flowchart for deleting a composite action from the catalog, according to one embodiment.

FIG. 26 is a flowchart of a method 2600 for deleting a composite action from the catalog, according to one embodiment. At block 2605, the embroidery application identifies an object in the catalog to delete. The object can be a composite action or a needle point path. For example, a user may determine that she added the wrong composite action and wish to delete it from the catalog. The user can select a delete function displayed in a GUI and then select the composite action she wishes to remove.

At block 2610, the embroidery application traverses the composite action network to identify composite actions linked to the object. The object the user wants to delete may be linked to other objects in the network, which can affect those objects. Again referring to FIG. 23, the composite actions 2320 and needle point paths 2325 can be linked to other objects. For example, assume the user wants to remove the composite action 2320C. Both composite action 2320A and 2320B link to this object (as illustrate by the arrows pointing towards the composite action 2320C). Thus, if composite action 2320C is removed, this means a portion of the embroidery designs for the composite actions 2320A and 2320B will be missing. Similarly, a needle point path 2325 can also be removed, but that affects any composite action that points to that path 2325, as well as any additional upstream composite actions 2320A.

In contrast, if the user wants to remove the composite action 2320A, there are no composite actions pointing to this action. Thus, if it were removed, it does not affect the embroidery design of any other action in the network 2315. However, it does affect the needle point paths in the action.

If at block 2615 there are no other linked objects that are affected if the object is removed from the catalog, the method 2600 proceeds to block 2620 where the identified object is removed. For example, to remove a needle point path in the catalog that is not part of a composite action, this can be removed without affecting any other objects. Also, if the object is a composite action not linked to any other composite action (e.g., the composite action is not a child of any other action, and only includes needle point paths), then the composite action and its needle point paths can be deleted.

However, if there are linked objects affected by the deletion, the method proceeds to block 2625 where the embroidery application outputs for display the linked objects that would be affected by the deletion. For example, the application can display all the composite actions that would have their embroidery designs changed by deleing another composite action or a needle point path.

At block 2630, the user tells the embroidery application whether to proceed with the deletion. If the user decides not to delete the object (i.e., does not give permission), the method 2600 proceeds to block 2635 where the catalog remains unchanged. However, if the user gives permission to delete the object, the method 2600 proceeds to block 2640 where the embroidery application deletes the object and all linked objects.

However, in another embodiment, rather than deleting the linked objects, the embroidery application may keep the affected linked objects in the catalog but flag those objects to indicate their designs were affected by deleting the object. This could be stored in the annotations of the linked objects. This gives the user the chance to fix the designs of the affected objects if she desires, rather than deleting them.

Figure 27:
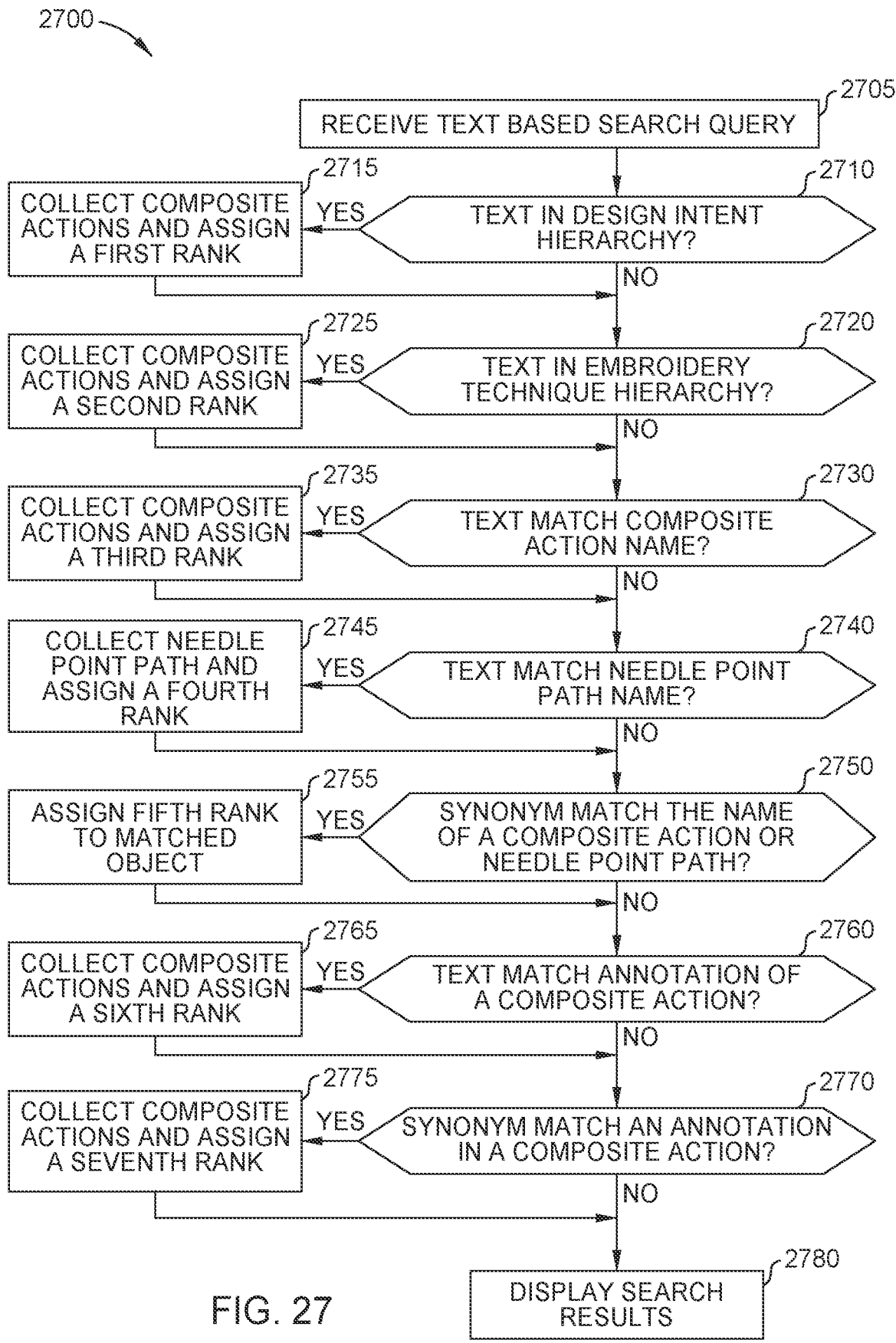
FIG. 27 is a flowchart for performing a text-based search of the catalog, according to one embodiment.

FIG. 27 is a flowchart of a method 2700 for performing a text-based search of the catalog, according to one embodiment. At block 2705, the search engine (e.g., the search engine 2345 in FIG. 23) receives a text based search query from a user. An example search query could include a design intent (e.g., a description of the design), keywords, and an embroidery technique. For example, the text based search query could be "rabbit in Blackworks" or "sunset in Redworks."

At block 2710, the search engine determines whether the text of the query is in the design intent hierarchy. The search engine can parse each word in the search query (and combination of words) to determine if they match a design intent in the design intent hierarchy for the catalog. In one embodiment, before doing so, the search engine may normalize the text in the query such as removing punctuation, removing capital letters, correcting any misspelled words, and the like. If the search query did not include text matching one of the design intents in the design intent hierarchy, then the method proceeds to block 2720.

However, assuming there is a match, the method 2700 proceeds to block 2715 where the search engine collects the composite actions in the list of composite actions that have the matched design intent. For example, if the catalog includes a first composite action with the associated design intent of "front facing rabbit" and a second composite action with the associated design intent of "side view of rabbit" and the search text included "rabbit", both of the composite actions would be identified by the search engine.

Moreover, the search engine assigns a first (highest) rank to these composite actions since they, at least partially, have design intents that match the design intent of the search text.

At block 2720, the search engine determines whether the text of the search query is in the embroidery technique hierarchy. The search engine can parse each word in the search (and combination of words) to determine if they match an embroidery technique in the embroidery technique hierarchy for the catalog. If the search query did not mention any embroidery techniques, or listed an embroidery technique not in the embroidery technique hierarchy, then the method proceeds to block 2730.

However, assuming there is a match, the method 2700 proceeds to block 2725 where the search engine collects the composite actions in the list of composite actions that have the matched embroidery technique (or techniques). The search engine assigns a second rank (e.g., the second highest rank) to these composite actions since they use an embroidery technique that matches the embroidery technique in the search text.

At block 2730, the search engine determines whether the text of the search matches a name of a composite action. If so, the method 2700 proceeds to block 2735 where the search engine collects the composite action with that same name and assigns it a third rank (e.g., the third highest rank).

If the catalog requires that each composite action have a unique name, then at most one composite action can be collected at block 2735 (unless there is a partial match of text in the search query to multiple names of composite actions). However, if a catalog permits multiple composite actions to have the same name, then multiple composite actions can be collected at this block.

At block 2740, the search engine determines whether the text of the search query matches a name of a needle point path. If so, the method 2700 proceeds to block 2745 where the search engine collects the needle point path with that same name and assigns it a fourth rank (e.g., the fourth highest rank).

If the catalog requires that each needle point path have a unique name, then at most one needle point path can be collected at block 2745 (unless there is a partial match of text in the search query to multiple names of needle point paths). However, if a catalog permits multiple needle point paths to have the same name, then multiple paths can be collected at this block.

At block 2750, the search engine determines whether a synonym of the text of the search query matches a name of a needle point path or a composite action. As mentioned above, when establishing the vocabulary of the catalog, the catalog creator can also identify and link synonyms. Thus, the search engine can determine whether the text in the search query has any synonyms, and if so, determine whether those synonyms match any names of the needle point paths or composite actions in the catalog. If so, at block 2755, those paths or composite actions are collected and assigned a fifth rank (e.g., the fifth highest rank).

At block 2760, the search engine determines whether the text of the search query matches an annotation of a composite action. If so, at block 2765, these composite actions are collected and assigned a sixth rank (e.g., the sixth highest rank).

At block 2770, the search engine determines whether a synonym of the text of the search matches an annotation of a composite action. Like at block 2750, at block 2770 the search engine can determine whether the text in the search has any synonyms, and if so, determine whether those synonyms match any annotations stored in the composite actions. If so, at block 2775, those paths or composite actions are collected and assigned a seventh rank (e.g., the seventh highest rank).

At block 2780, the search engine displays the results. For example, the search results may be displayed on a GUI on a user device. Further, the results are ranked using the ranking assigned in the previous blocks. For example, any matches assigned the first rank are displayed first in the search results, any matches assigned the second rank are displayed under the matches assigned the first rank, any matches assigned the third rank are displayed under the matches assigned the second rank, and so forth. Alternatively, the matches can be assigned colors corresponding to the rank, where, for example, matches with higher ranks are assigned brighter colors and matches with lower ranks are assigned darker colors.

In another embodiment, a composite action or needle point path may be assigned multiple ranks. For example, a composite action may have the same design intent as the design intent of the search query, as well as have an annotation that matches a word in the search query. Thus, that composite action is assigned both the first rank and the sixth rank. In one embodiment, the search engine may ignore the lower rank and only order the search result using the highest rank. Alternatively, the search engine may use the lower ranks to rank search results that have the same highest rank. For example, assume that a first composite action is assigned the second rank and the sixth rank, while a second composite action is assigned only the second rank. When displaying these result, the first composite action may be listed above the second composite action (or given a brighter color) to indicate it has multiple matches to the text in the search query. Continuing this example, if a third composite action is assigned the second rank and the seventh rank, it may be displayed below the first composite action but above the second composite action.

However, the method 2700 is just one example of a search algorithm for using the text from a search query to then match and rank composite actions and needle point paths in the catalog. Other search algorithms can use a search history to supplement the search result (e.g., to identify the most popular selected composite actions or needle point paths and assign them higher ranks) or use natural language processing to edit the text in the search query (e.g., remove articles, change phrases, remove slang, etc.) before attempting to match the text in the search query to the metadata corresponding to the composite actions and needle point paths (e.g., the design intents, embroidery techniques, names, and annotations). Further, the assigned ranks in the method 2700 are just one example of a rank hierarchy could. For example, the search results may be improved if identifying a match to a name of the composite action is assigned a higher rank than identifying a match to an embroidery technique.

Figure 28:
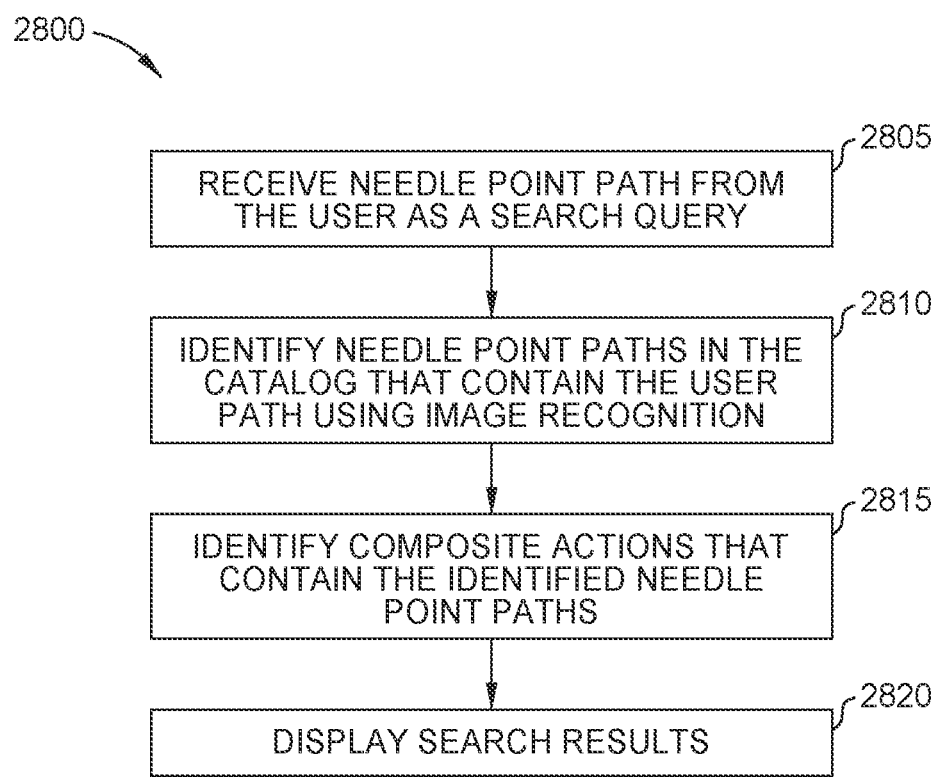
FIG. 28 is a flowchart for performing an image-based search of the catalog, according to one embodiment.

FIG. 28 is a flowchart of a method 2800 for performing an image-based search of the catalog, according to one embodiment. At block 2805, the search engine receives a needle point path from the user to use as a search query. In one embodiment, the user directly provides the needle point path. For example, the search engine may provide, using a GUI, a space where the user can draw a needle path that she wants to use to search the catalog. For example, if the user is looking for a composite action of a rose, she can sketch a rose using a stylus. This may be a rough sketch of the rose, rather than the user taking the time to make a sketch that would be suitable for being embroidered onto a shirt. Using the embodiments above, the embroidery application can generate a needle path based on the user's hand drawn sketch.

In another embodiment, the user may provide an image of the object she is looking for. For example, the user may provide the search engine with an image of a rose. As mentioned above, it is difficult for graphical images to be directly converted into needle point paths, but the search engine can perform a rough conversion of the image to generate a needle point path. For example, the search image (or a digital image application) can emboss the received image to identify an outline of the image. This outline can be traced to provide a rough needle point path. However, using image embossing is just one example of converting an image to a needle point path.

At block 2810, using image recognition, the search image identifies a needle point path (or paths) in the catalog that is similar to the user provided needle point path. In one embodiment, the search engine (or a digital image application) uses image recognition on the needle point path to generate line graphs which can then be compared to the needle point path received from the user. The similarities between the user provided needle point path and the needle point paths in the catalog can be ranked using known techniques. For example, the similarities between the user needle point path and a needle point path in the catalog may have to satisfy a threshold before the needle point path is considered a match. The amount of similarity can also be used to rank the matching needle point paths—e.g., a needle point path with a more similar visual appearance to the user provided needle point path is assigned a higher ranking than needle point paths with less visual similarities to the user provided needle point path.

At block 2815, the search engine identifies the composite actions that contain the identified needle point path.

At block 2820, the search engine displays the search results of the identified composite actions in a GUI. The composite actions can be displayed in an order (or with a color) based on the visual similarities between the needle point paths in those composite actions and the user provided needle point path.

In one embodiment, an embroidery application provides both the textual search of the catalog using the method 2700 and the visual search using the method 2800. Further, the methods 2700 and 2800 can be used in combination. For example, the user may provide both a textual search and a needle point path of the desired embroidery design. The search engine can first perform the method 2700 to identify a set of composite actions and then use the method 2800 to determine whether that set of composite actions contain a needle point path similar to the one provided by the user. The result of performing method 2800 to identify visual similarities can then be used to reorder or reduce the set of composite actions found using the method 2700. The reverse is also possible where the search engine uses the method 2800 to identify a set of composite actions and then the textual search in the method 2700 is performed on that set of composite actions to reorder or reduce that set. The resulting set of composite actions from executing both type of searches can then be displayed to the user.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
providing a catalog of embroidery designs, the catalog comprising a composite action network containing a plurality of composite actions linked together, each of the plurality of composite actions defining one of the embroidery designs;
establishing a vocabulary for the catalog, the vocabulary comprising a source of words for describing the embroidery designs defined by the plurality of composite actions;
establishing a design intent hierarchy for the catalog, the design intent hierarchy comprising a plurality of design intents linked together at different levels, wherein the plurality of design intents describes the embroidery designs;
establishing an embroidery technique hierarchy for the catalog, the embroidery technique hierarchy comprises a plurality of embroidery techniques linked together using different levels, wherein the plurality of embroidery techniques describes types of embroidery used in the embroidery designs;
receiving a search query; and
searching the catalog by comparing the search query to the vocabulary, the design intent hierarchy, and the embroidery technique hierarchy to identify a composite action of the plurality of composite actions that matches the search query; and
transmitting for display the composite action that matched the search query.

2. The method of claim 1, further comprising:
identifying a first composite action to add to the catalog;
determining whether the first composite action is already in the catalog;
upon determining the first composite action is not in the catalog, determining whether the first composite action includes a child composite action;
upon determining the first composite action includes a child composite action, determining whether the child composite action is already in the catalog;
upon determining the child composite action is not in the catalog, adding needle point paths corresponding to the first composite action and the child composite action to a list of needle point paths in the catalog; and
adding the first composite action and the child composite action to the composite action network, wherein the child composite action is linked to the first composite action in the composite action network.

3. The method of claim 2, further comprising, before adding the needle point paths to the list of needle point paths in the catalog:

determining whether the needle point paths are already in the catalog, wherein the needle point paths are added after determining the needle point paths are not already in the catalog.

4. The method of claim 1, further comprising:
identifying a first composite action to delete from the catalog;
traversing the composite action network to determine whether any composite actions are linked to the first composite action;
upon determining a second composite action is linked to the first composite action in the composite action network, querying a user to determine whether to proceed with deleting both the first and second composite actions; and
upon receiving permission from the user, deleting both the first and second composite actions.

5. The method of claim 4, wherein traversing the composite action network includes identifying a third composite action linked to the second composite action, wherein querying the user comprises determining whether to proceed with deleting the third composite action as well as the first and second composite actions.

6. The method of claim 1, further comprising:
receiving a needle point path as a second search query;
identifying, using image recognition, at least one needle point path in the catalog that matches the second search query;
identifying a composite action of the plurality of composite actions that includes the at least one needle point path that matches the second search query; and
transmitting for display the composite action that includes the at least one needle point path as a response to the second search query.

7. The method of claim 6, wherein the needle point path is hand drawn by a user and submitted as the second search query.

8. The method of claim 1, wherein searching the catalog comprises:
determining that text in the search query matches a design intent in the design intent hierarchy;
collecting a first set of composite actions in the plurality of composite actions that have the matched design intent;
determining that text in the search query matches an embroidery technique in the embroidery technique hierarchy;
collecting a second set of composite actions in the plurality of composite actions that have the matched embroidery technique; and
transmitting for display the first and second sets of composite action as results of the search query.

9. The method of claim 8, wherein the first set of composite actions are assigned a first rank that is higher than a second rank assigned to the second set of composite actions, the method further comprising:
displaying the first set of composite actions above the second set of composite actions based on the first and second ranks.

10. The method of claim 1, further comprising:
training a machine learning (ML) model using the plurality of composite actions in the catalog as well as design intents and embroidery techniques corresponding to the plurality of composite actions.

11. A non-transitory computer-readable medium containing computer program code that, when executed by operation of one or more computer processors, performs an operation comprising:
providing a catalog of embroidery designs, the catalog comprising a composite action network containing a plurality of composite actions linked together, each of the plurality of composite actions defining one of the embroidery designs;
establishing a vocabulary for the catalog, the vocabulary comprising a source of words for describing the embroidery designs defined by the plurality of composite actions;
establishing a design intent hierarchy for the catalog, the design intent hierarchy comprising a plurality of design intents linked together at different levels, wherein the plurality of design intents describes the embroidery designs;
establishing an embroidery technique hierarchy for the catalog, the embroidery technique hierarchy comprises a plurality of embroidery techniques linked together using different levels, wherein the plurality of embroidery techniques describes types of embroidery used in the embroidery designs;
receiving a search query; and
searching the catalog by comparing the search query to the vocabulary, the design intent hierarchy, and the embroidery technique hierarchy to identify a composite action of the plurality of composite actions that matches the search query; and
transmitting for display the composite action that matched the search query.

12. The non-transitory computer-readable medium of claim 11, wherein the operation further comprises:
identifying a first composite action to add to the catalog;
determining whether the first composite action is already in the catalog;
upon determining the first composite action is not in the catalog, determining whether the first composite action includes a child composite action;
upon determining the first composite action includes a child composite action, determining whether the child composite action is already in the catalog;
upon determining the child composite action is not in the catalog, adding needle point paths corresponding to the first composite action and the child composite action to a list of needle point paths in the catalog; and adding the first composite action and the child composite action to the composite action network, wherein the child composite action is linked to the first composite action in the composite action network.

13. The non-transitory computer-readable medium of claim 12, wherein the operation further comprises, before adding the needle point paths to the list of needle point paths in the catalog:
determining whether the needle point paths are already in the catalog, wherein the needle point paths are added after determining the needle point paths are not already in the catalog.

14. The non-transitory computer-readable medium of claim 11, wherein the operation further comprises:
identifying a first composite action to delete from the catalog;
traversing the composite action network to determine whether any composite actions are linked to the first composite action;

upon determining a second composite action is linked to the first composite action in the composite action network, querying a user to determine whether to proceed with deleting both the first and second composite actions; and upon receiving permission from the user, deleting both the first and second composite actions.

15. The non-transitory computer-readable medium of claim 14, wherein traversing the composite action network includes identifying a third composite action linked to the second composite action, wherein querying the user comprises determining whether to proceed with deleting the third composite action as well as the first and second composite actions.

16. A method, comprising:
providing a catalog of embroidery designs defined by a plurality of composite actions,
  wherein the catalog is associated with a design intent hierarchy comprising a plurality of design intents linked together at different levels, wherein the plurality of design intents describes the embroidery designs,
  wherein the catalog is associated with an embroidery technique hierarchy comprising a plurality of embroidery techniques linked together using different levels, wherein the plurality of embroidery techniques describes types of embroidery used in the embroidery designs; receiving a search query of the catalog;
determining that text in the search query matches a design intent in the design intent hierarchy;
collecting a first set of composite actions in the plurality of composite actions that have the matched design intent;
determining that text in the search query matches an embroidery technique in the embroidery technique hierarchy;
collecting a second set of composite actions in the plurality of composite actions that have the matched embroidery technique; and
transmitting for display the first and second sets of composite action as results of search query.

17. The method of claim 16, further comprising:
receiving a needle point path as a second search query;
identifying, using image recognition, at least one needle point path in the catalog that matches the second search query;
identifying a composite action of the plurality of composite actions that includes the at least one needle point path that matches the second search query; and
transmitting for display the composite action that includes the at least one needle point path as a response to the second search query.

18. The method of claim 17, wherein the needle point path is a hand drawn by a user and submitted as the second search query.

19. The method of claim 16, wherein the first set of composite actions are assigned a first rank that is higher than a second rank assigned to the second set of composite actions, the method further comprising:
displaying the first set of composite actions above the second set of composite actions based on the first and second ranks.

20. The method of claim 16, wherein the catalog comprises a composite action network where the plurality of composite actions are linked together to form parent-child relationships.

* * * * *